United States Patent
Blake et al.

(10) Patent No.: US 9,783,419 B2
(45) Date of Patent: Oct. 10, 2017

(54) PHOSPHOROUS PENTOXIDE PRODUCING METHODS AND SYSTEMS WITH INCREASED AGGLOMERATE COMPRESSION STRENGTH

(71) Applicant: JDCPhosphate, Inc., Fort Meade, FL (US)

(72) Inventors: David B. Blake, Lakeland, FL (US); Joseph A. Megy; Sourabh A. Pachpor, Lakeland, FL (US); Lawrence M. Handman, Los Angeles, CA (US); Theodore P. Fowler, Lakeland, FL (US); James A. Trainham, Lakeland, FL (US); Mark Vignovic, Lakeland, FL (US)

(73) Assignee: JDCPhosphate, Inc., Fort Meade, FL (US)

( * ) Notice: Subject to any disclaimer, the term of this patent is extended or adjusted under 35 U.S.C. 154(b) by 207 days.

(21) Appl. No.: 14/864,731

(22) Filed: Sep. 24, 2015

(65) Prior Publication Data
US 2016/0090305 A1    Mar. 31, 2016

Related U.S. Application Data

(60) Provisional application No. 62/056,254, filed on Sep. 26, 2014, provisional application No. 62/085,778, filed on Dec. 1, 2014.

(51) Int. Cl.
*C01B 25/12* (2006.01)

(52) U.S. Cl.
CPC .................................. *C01B 25/12* (2013.01)

(58) Field of Classification Search
None
See application file for complete search history.

(56) References Cited

U.S. PATENT DOCUMENTS

| | | |
|---|---|---|
| 2,075,212 A | 3/1937 | Levermore et al. |
| 3,235,330 A | 2/1966 | Lapple |

(Continued)

FOREIGN PATENT DOCUMENTS

| | | |
|---|---|---|
| CN | 1044077 | 7/1990 |
| CN | 1562847 | 1/2005 |

(Continued)

OTHER PUBLICATIONS

Perry's Chemical Engineers' Handbook, 1984, Sixth Edition, pp. 19-35 through 19-40, McGraw-Hill Book Company.

(Continued)

*Primary Examiner* — Wayne Langel
(74) *Attorney, Agent, or Firm* — Parsons Behle & Latimer

(57) ABSTRACT

A phosphorous pentoxide producing method includes forming pre-feed agglomerates containing phosphate ore particles, carbonaceous material particles, and silica particles and heating the pre-feed agglomerates in a reducing or inert atmosphere to an induration temperature from above 900 C to less than 1180 C and maintaining the induration temperature for 15 minutes or more. The method includes forming feed agglomerates and increasing a compression strength of the feed agglomerates to above 25 $lb_f$ using the heating, the feed agglomerates exhibiting a calcium-to-silica mole ratio less than 1 and a silica-to-(calcium+magnesium) mole ratio greater than 2. A reducing kiln bed is formed using the feed agglomerates, kiln off-gas is generated, and phosphorous pentoxide is collected from the kiln off gas.

23 Claims, 17 Drawing Sheets

(56) References Cited

U.S. PATENT DOCUMENTS

| | | |
|---|---|---|
| 3,241,917 A | 3/1966 | Lapple |
| 3,341,289 A | 9/1967 | Hendrickson |
| 3,558,114 A | 1/1971 | Saeman |
| 3,591,336 A | 7/1971 | Saeman |
| 3,598,315 A | 8/1971 | Seymour |
| 3,760,048 A | 9/1973 | Sullivan et al. |
| 3,923,961 A | 12/1975 | Dancy |
| 4,014,682 A | 3/1977 | Majewski |
| 4,263,262 A | 4/1981 | Jukkola |
| 4,321,238 A | 3/1982 | Henin |
| 4,351,809 A | 9/1982 | Megy et al. |
| 4,351,813 A | 9/1982 | Megy et al. |
| 4,372,929 A | 2/1983 | Barber |
| 4,383,847 A | 5/1983 | Barber |
| 4,389,384 A | 6/1983 | Hard |
| 4,397,826 A | 8/1983 | Hard et al. |
| 4,420,466 A | 12/1983 | Park et al. |
| 4,421,521 A | 12/1983 | Barber |
| 4,451,277 A | 5/1984 | Barber |
| 4,514,366 A | 4/1985 | Barber |
| 4,537,615 A | 8/1985 | Barber |
| 4,603,039 A | 7/1986 | Kuxdorf et al. |
| 4,608,241 A | 8/1986 | Barber |
| 4,649,035 A | 3/1987 | Barber |
| 4,656,020 A | 4/1987 | Megy |
| 4,774,064 A | 9/1988 | Arnold et al. |
| 4,919,906 A | 4/1990 | Barber |
| 5,100,314 A | 3/1992 | Rierson |
| 5,228,895 A | 7/1993 | Kelly et al. |
| 5,572,938 A | 11/1996 | Leger |
| 5,743,934 A | 4/1998 | Wommack et al. |
| 6,342,089 B1 | 1/2002 | McGaa |
| 6,921,520 B2 | 7/2005 | Barber |
| 6,932,002 B2 | 8/2005 | May et al. |
| 7,378,070 B2 | 5/2008 | Megy |
| 2004/0067187 A1 | 4/2004 | Barber |
| 2004/0109809 A1 | 6/2004 | Hokanson et al. |
| 2005/0002845 A1 | 1/2005 | Hokanson et al. |
| 2007/0253882 A1* | 11/2007 | Megy .............. C01B 25/12 423/304 |
| 2008/0289385 A1 | 11/2008 | Megy |
| 2013/0136682 A1 | 5/2013 | Megy |

FOREIGN PATENT DOCUMENTS

| | | |
|---|---|---|
| CN | 1837129 | 9/2006 |
| JP | 2185930 | 7/1990 |
| SU | 976245 | 11/1982 |
| SU | 1310073 | 1/1988 |
| WO | WO2004052938 | 6/2004 |
| WO | WO2005118468 | 6/2005 |
| WO | WO2008043222 | 4/2008 |
| WO | WO2008153521 | 12/2008 |

OTHER PUBLICATIONS

Novel Binders and Methods for Agglomeration of Ore, Michigan Technological University Department of Chemical Engineering Apr. 1, 2004.
JDCPhosphate Newsletter Winter 2011, vol. 1, Issue 1 Jan. 1, 2011.
International Search Report for PCT/US2007/013834 dated Oct. 24, 2007.
Dust Suppressants for Temporary Helicopter Landing Areas, United States Department of Agriculture Forest Service, Alan Yamada, P.E., Civil Engineer, Project Leader Dec. 1, 1998.
Qiu, Liyou, et al, "Study on operation temperature range of the rotary kiln in KPA process;" Abstract of Huaxue Fanying Gongcheng Yu Gongyi, 11(2), 203-y (Chinese), 1995, Chem. Abstr., 1997, 1 page, 123:203622/ Jan. 1, 1995.
Qiu, Liyou et al, "Study on kiln gas production in a rotary kiln for the KPA process;" Abstract of Huaxue Fanying Gongcheng Yu Gongyi, 9(1), 90-7 (Chinese), 1993, Chem. Abstr., 1997, 1 page, 120:110744.
Megy, Joseph A., "Rotary kiln process for phosporic acid manufacture." Abstract of WO 2005118468, Dec. 15, 2005, Chem. Abstr. 2007, 1 page, 144:24490. Dec. 15, 2005.
Mu, et al,. "Reduction of Tricalcium Phosphate by Carbon" I&EC, vol. 21, No. 11, 1929, pp. 1126.1132 Jan. 1, 1929.
Misao, Masahiro, et al, "Reduction of ore pellets in rotary kiln," Abstract of JP0218590A2, Jul. 20, 1990, Chem. Abstr. 1997, 1 page, 114:251117. Jul. 20, 1990.
Jacob, et al. "Reduction of Phosphate Ordes by Carbon: Part 1, Process Variables for Design of Rotary Kiln System," Metallurgical Transactions B, vol. 17B, Dec. 1986, pp. 861-868. Dec. 1, 1986.
Yang, Shimo, "Production of phosphoric acid by combustion of lean phosphorus mud in rotary kiln," Abstract of CN 85104782 A, Dec. 10, 1986, Chem. Abstr. 1997, 1 page, 108:8278 Dec. 10, 1986.
Ni et al, "Preparation of High-Concentration Phosphoric Acid by Direct Reduction of Midlle/Low Grade Phosphorite." Abstract of CN 101125646 A, Feb. 20, 2008, Chem. Abst. 2008, 1 page, 148:358299 Feb. 20, 2008.
Perry's Chemical Engineers' Handbook, 1984, Sixth Edition, pp. 19-35 through 19-40, McGraw-Hill Book Company. Jan. 1, 1984.
Zhantasov, K.T., et al; "Pelletization of Phosphate-siliceous ore fines in a rotary kiln;" Abstract of Kompleksn, Ispol'z Miner. Syr'ya, (11), 27-30 (Russian) 1987, Chem. Abst. 1997, 1 page, 108:97143.
International Bureau, International Preliminary Report on Patentability for PCT/US2005/019598 dated Mar. 8, 2007.
Leder, et al, "New Process for Technical-Grade Phosphoric Acid," American Chemical Society, 1986. Jan. 1, 1986.
Zhang, Dingbin et al, "Industrial vertical flame-isolating kiln for preparing yellow phosphorus or phosphoric acid from phosphores ores;" Abstract o fCN 101298959 A, Nov. 5, 2008, Chem. Abst. 2008, 1 page, 149:536540. Nov. 5, 2008.
Rierson, David W., "Illmenite Direct Reduction Project in Norway Using the Grate-Car (TM) Process" AIME Conferene, 1992. Jan. 1, 1992.
Paul, et al, "Desulfurization of Petroleum Coke Beyond 1600' C" Light Metals 2001, The Minerals, Metals & Materials Society, 2001. Jan. 1, 2001.
Zhang, Dingbin, et al. "A method for manufacturing phosphoric acid and construction bricks from phosphorus-containing tailings obtained in phosphorite benefication," Abstact of CN 1837129 A, Sep. 27, 2006, Chem. Abstr., 2007, 1 page, 145:424251. Sep. 27, 2006.
US Patent and Trademark Office, Office Action for U.S. Appl. No. 12/186,43 dated Jul. 27, 2010.
US Patent and Trademark Office, Office Action for U.S. Appl. No. 12/125,751 dated Sep. 5, 2008.
US Patent and Trademark Office, Office Action for U.S. Appl. No. 11/818,115 dated Oct. 4, 2007.
US Patent and Trademark Office, Office Action for U.S. Appl. No. 11/330,034 dated Sep. 28, 2006.
US Patent and Trademark Office, Final Office Action for U.S. Appl. No. 11/330,034 dated May 8, 2007.
US Patent and Trademark Office, Office Action for U.S. Appl. No. 11/145,564 dated Jun. 27, 2006.
US Patent and Trademark Office, Office Action for U.S. Appl. No. 13/306,890, dated Jun. 10, 2013.
ISR-WO for Serial No. PCT/US2012/066597, dated Apr. 10, 2013.
Extended European Search Report for EP Application No. PB141591EP, dated Sep. 23, 2011.

* cited by examiner

PHOSPHOROUS PENTOXIDE PRODUCING METHODS AND SYSTEMS WITH INCREASED AGGLOMERATE COMPRESSION STRENGTH

CROSS REFERENCE TO RELATED APPLICATIONS

This application claims the benefit of priority under 35 U.S.C. §119 to U.S. Provisional Patent Application No. 62/056,254, filed on Sep. 26, 2014 and entitled "Process for Phosphorous Pentoxide Production" and to U.S. Provisional Patent Application No. 62/085,778, filed on Dec. 1, 2014 and entitled "Process for Phosphorous Pentoxide Production and Purification," each of which are incorporated herein by reference.

BACKGROUND

FIG. 1 shows the block flow diagram disclosed in U.S. Pat. No. 7,378,070, entitled "Phosphorous Pentoxide Producing Method," issued to Joseph A. Megy (hereinafter referred to as "Megy Patent"), and describing the Improved Hard Process (IHP). FIG. 1 is also disclosed in U.S. Pat. No. 7,910,080, with the same title, inventor, and description of the IHP. Both patents are incorporated herein by reference.

Initially, various known processes and equipment were expected to be suitable for use in implementing the IHP beyond the laboratory and pilot scale at the demonstration plant scale. However, some of the known processes and/or equipment revealed unintended production constraints on the IHP that were not observed previously in other contexts. Consequently, additionally research and development was warranted to reduce production constraints and to achieve, and possibly to exceed, a production efficiency in scaled-up operations that was observed in the laboratory and pilot plant.

BRIEF DESCRIPTION OF THE DRAWINGS

Some embodiments are described below with reference to the following accompanying drawings.

DETAILED DESCRIPTION

Phosphorus pentoxide production methods and systems described herein significantly reduce dust formed in the Improved Hard Process (IHP). Scale-up of the IHP exhibited significant dust formation in the kiln used for the carbothermal reduction of phosphorous ore. The methods include processes to modify the feed agglomerates to reduce dust formation in the reduction kiln and to remove dust when formed in the process. The methods also include processes to remove ore contaminants yielding a higher quality phosphoric acid product.

Figure 1:
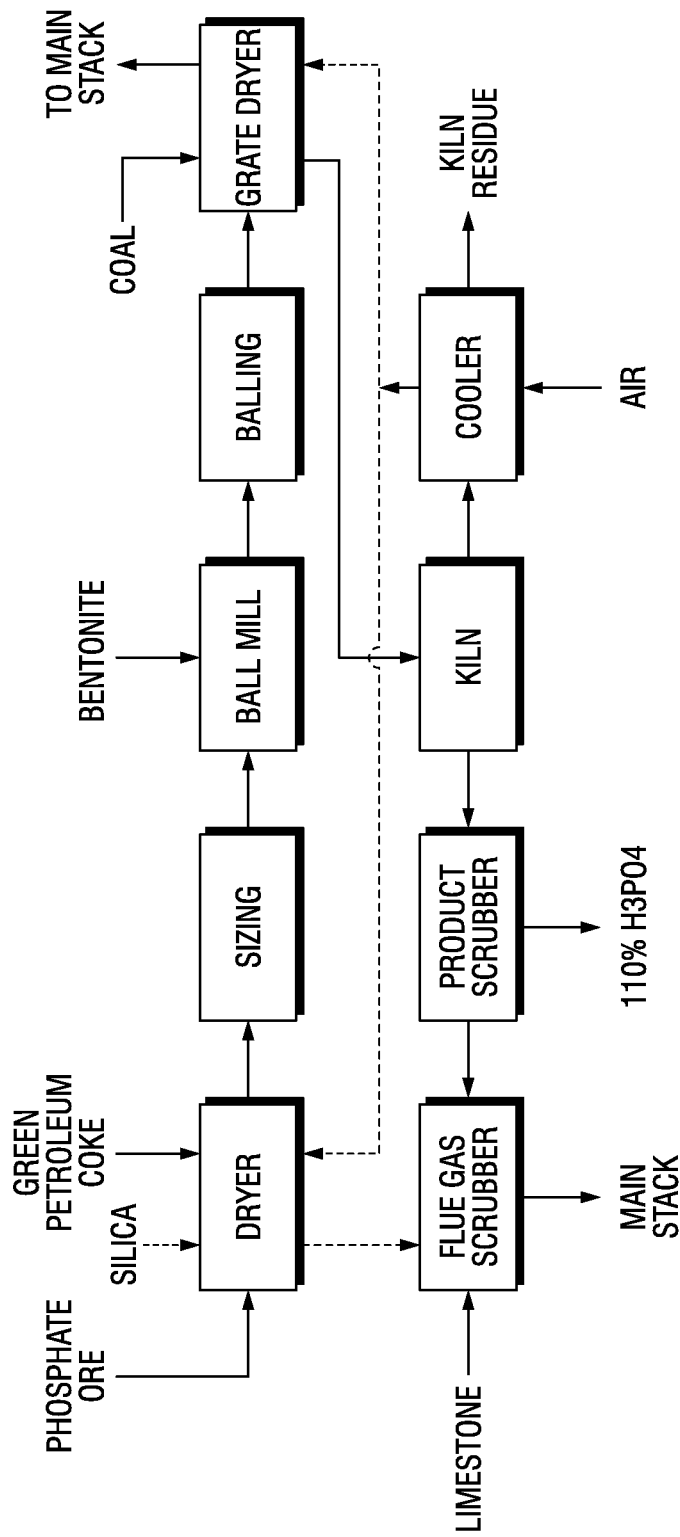
FIG. 1 shows a flowsheet for the Improved Hard Process of U.S. Pat. No. 7,378,070.

"Dust formation" in the Kiln (hereby designated as the reduction kiln) in FIG. 1 was not observed as an issue at the pilot-scale as described in the Megy Patent. Dust has four major deleterious effects: 1) dust in the reduction kiln is transported to the reduction kiln freeboard and can back react with the $P_4O_{10}/P_2O_5$ to form calcium metaphosphate resulting in a yield loss; 2) the calcium metaphosphate deposits on kiln and duct surfaces; 3) dust may consist of individual raw feed material constituents susceptible to lower temperature melting; and 4) dust can be transported to the Product Scrubber (FIG. 1), which can be rendered inoperable, plus dust can react with Product Acid reducing overall yield. It was observed at the demonstration-plant scale, where the reduction kiln inside diameter was 6 feet and length was 94 feet that dust formation was caused by agglomerate (balls, pellets, etc.) attrition and breakage. The agglomerates produced by the process shown in FIG. 1 (shown as BALLING) were produced via a balling drum and exhibited agglomerate compressive strengths of 25 $lb_f$ or less (pound (force); 111 Newtons (N)) (see Example 1).

Observing that intact agglomerates that exited the reduction kiln exhibited compression strength that far exceeded 50 $lb_f$ (222 N) led to the methods and systems herein. Laboratory testing showed that hardened agglomerates exhibited low attrition and breakage in tumble tests. Additional laboratory studies were initiated to understand the hardening phenomenon. It was discovered that hardening of the agglomerates occurred in a narrow temperature range approximately 930 to 1125 C, which is below the carbothermal reduction temperature of phosphorous ore of 1180 C.

The process engineering described in the methods and systems herein is the practical means to achieve hardened agglomerates with compression strength above 25 $lb_f$ if heated to temperatures above 900 C, such as above 930 C, hereby referred to as induration. The induration process may be run under reducing or inert conditions so carbon oxidation is decreased or minimized. Also, described in the methods and systems herein is the use of polymer additives to initially strengthen the agglomerates before they are hardened thermally.

Induration of feed agglomerates (including pellets) is not a new process. In the iron industry, induration has been practiced for over 50 years. Iron ore pellets have a known composition: 63-65% Fe ($\approx$93% $Fe_2O_3$), 3-5% $SiO_2$, 3-5% pet coke, the remaining constituents are mostly CaO and MgO. The iron ore pellets are fed to an indurating grate-kiln system or a straight grate and heated with known gas temperatures 1000-1300 C. The iron ore pellets achieve compression strength above 200 $lb_f$ (890 N). The sources of strength of the iron ore pellets is oxidation of ferrous iron oxides to ferric iron oxides which results in some bonding and bridging with re-crystallization of the iron oxides. The iron ore induration process is carried out in an oxidation environment where the pet coke is used for fuel.

It is surprising that such a heat treatment process strengthens the phosphate containing agglomerate to reduce dust in the Improved Hard Process. The chemical differences between iron ore pellets and phosphate agglomerates are striking with the agglomerates containing approximately 56% $SiO_2$, 20% CaO, 11% $P_2O_5$, 8% pet coke, 2% clay with 1% each of MgO, $Fe_2O_3$ and $Al_2O_3$ all on a dry basis. The phosphorous containing agglomerate induration process is carried out under reducing conditions so that the pet coke oxidation is decreased and below the carbothermal reduction temperature of $P_2O_5$.

An initial study of the phosphorous containing agglomerate hardening chemistry was investigated via x-ray diffraction (XRD) analysis and scanning electron microscopy (SEM). Examination of agglomerate samples after heat treatment at 500, 800, 950, 1025, and 1100 C yielded the following observations:

1. Dolomite in the 500 C sample was identified, but was not present in samples above 800 C.
2. Bridging is mostly between silica particles and amorphous glue (described in 3 below) not sticking to carbon or fluoroapatite particles.
3. Bridging material is Calcium (Magnesium) Silicate amorphous material with a surprisingly large amount of contained phosphate.
4. Some Calcite particles were found in the 500 C sample, but it appears most Calcite is inside the fluoroapatite particles. The fluoroapatite particles develop porosity at 1000 C where you would expect the Calcite to decompose.
5. The hardening chemistry requires approximately 930 C to form the strengthening bridges. Note this is just above the known Calcite decomposition temperature.
6. The bridges clearly wet the silica over long boundaries around the particles.

Laboratory and demonstration plant (12,000 ton scale (10,900 metric ton)) observation, data, and innovation resulted in new process technology that overcomes a major deficiency: dust formation in the ported kiln, as described in the Megy patent and shown in FIG. 1. The methods and systems herein provide specific process improvements that significantly reduce and remove dust. The methods and systems herein add process steps and equipment modifications and provide other process improvements, such as the removal of metals and chloride from the reduction kiln feed thereby decreasing product acid contamination, to the process described in the Megy patent (see FIGS. 2-10 for alternative flowsheets), as described below:

a) In the Megy Patent, the agglomerates described include: composition, volatile content, and size. The process description in the Megy Patent does not specifically describe the "Balling" step shown in the flow diagram FIG. 1. Note that in the methods and systems herein a balling drum, a balling disc, or a pelletizer system can be used to form agglomerates. Hereinafter, the pelletizer system is defined as the extrusion of the desired mixture. Constituents may include silica, phosphate ore, pet coke, and clay (Bentonite and/or natural) and may be extruded through a die into cylinders and cut to lengths so that the length-to-diameter ratio (L/D)$\approx$1:1. A spheroidization step may follow to remove sharp edges. The agglomerate can be wet or dry during spheroidization, which is accomplished by tumbling or vibrating the agglomerates, screening the removed edges, and recycling the edge material.

b) The initial demonstration plant (first large scale, 12,000 ton plant; reduction to practice of Megy patent) uses only a "Balling Drum" to coalesce the feed ingredients (phosphate ore, silica, petroleum coke) into feed agglomerates. These agglomerates exhibit compressive strength of 25 $lb_f$ or less, usually between 10-20 $lb_f$. It was observed that such agglomerates have insufficient compressive strength to be processed in the ported-reduction kiln without attrition and/or loosing integrity and producing significant dust inside the kiln. The dust reduces yield through back reaction in the kiln freeboard and significantly affects operability of the kiln and downstream equipment.

c) The methods and systems herein may significantly reduce (by over 90%) the dust formation in the ported kiln by introducing additional process steps that harden the agglomerates to well over 25 $lb_f$ compressive strength. Under certain process conditions, the compressive strength can exceed 100 $lb_f$.

d) The methods and systems herein may also increase heat recovery enabling increased heat integration.

e) The methods and systems herein may also increase the concentration of $P_4O_{10}/P_2O_5$ leaving the ported kiln from approximately 8% to over 14% that will reduce the size of the acid plant helping to offset the additional capital investment introduced by the additional processing steps.

f) The methods and systems herein describe various processes to heat treat the agglomerates (induration) and/or the introduction of a polymer binder/coating before heat treatment or in the absence of a separate heat treatment step that is not described in the Megy patent.

g) The methods and systems herein may add standpipes to the ports inside the reducing kiln that extend above the bed height. The standpipes decrease or eliminate the capture of agglomerates and dust in over bed air ports that are dumped from the ports as they rotate to the kiln apex, which leads to more dust formation and dispersion of dust in the kiln freeboard.

h) The methods and systems herein also may include intermediate storage of the agglomerates after induration that will increase plant availability (actual operating hours/planned and unplanned operating hours).

i) The methods and systems herein may provide for the removal of dust that does form during the induration process and in the ported kiln.

j) The methods and systems herein may provide for the removal of ore contaminants such as Aluminum, Arsenic, Cadmium, Chloride, Lead and Mercury.

k) These methods and systems herein may provide for the cogeneration of electricity or heat for process or domestic utility purposes.

l) The method and systems herein may increase green agglomerate strength at ambient to induration temperatures m) The method and systems herein may accomplish induration by a grate, grate-kiln system, or a kiln. The kiln can be a rotary co-current, rotary counter-current, or tunnel.

The present methods and systems may provide various processes to harden the feedstock agglomerates above 25 $lb_f$ compression strength before they are fed to the ported kiln, and remove dust formed during the induration process and in the ported kiln, thereby decreasing the dust to acceptable levels, which does not reduce yield or operation of the product scrubber.

It was observed in the laboratory and at demonstration plant-scale tests that agglomerates could be indurated (hardened above 25 $lb_f$ compression strength if heated to temperatures above 900 C, such as above 930 C). The induration process may be done under reducing/inert conditions that harden the agglomerates and decreases or eliminates carbon burnout and phosphorous ore carbothermal reduction (below the 1180 C reaction temperature). In addition, the agglomerates leaving the induration process may be cooled indirectly under reducing/inert conditions so they maintain their strength and carbon content unless the indurated agglomerates are fed directly to the ported kiln. FIGS. 2-8 show various processes for accomplishing this induration process.

Figure 2:
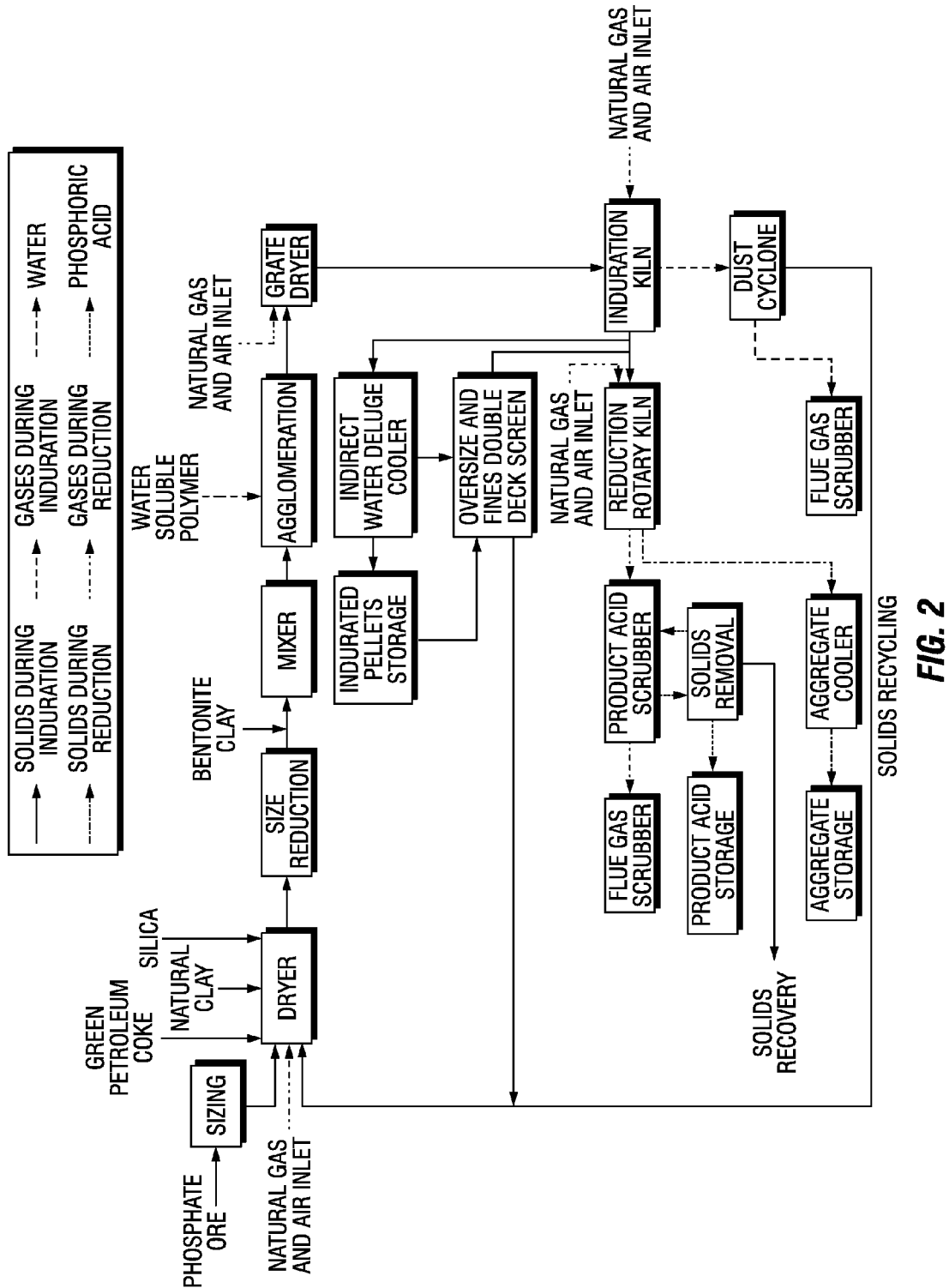
FIG. 2 shows a flowsheet for an induration and reduction rotary kiln with intermediate product storage.

FIG. 2 shows one of the most conservative designs, where green agglomerates (agglomerates made by a balling drum or disc or a pelletizer system) are fed over a grate dryer and then fed to an induration kiln, followed by a cooler, dust separator/scrubber, intermediate storage, and finally to the ported reduction kiln. A benefit of such a system is the ability to harden the agglomerates, maintain their hardness, and to remove dust prior to feeding the agglomerates to the reduction rotary kiln. The intermediate storage can be sized for a few hours to days. It allows de-coupling of the feed preparation section of the process from the main reaction section and final product formation. The intermediate storage container can be insulated or not. Insulating the storage of the hardened agglomerates may reduce the heat requirements in the downstream process steps. Also shown, is the use of water-soluble polymer and Bentonite clay or natural clay. In the methods and systems herein, the clay additives may be used alone or as a mixture. Although beneficial, any of the FIG. 2-10 systems may be operated without the clay. It is also possible to by-pass or eliminate the indirect cooler and intermediate storage. The gas stream leaving the induration kiln in FIG. 2 contains gaseous components and entrained dust. The gaseous components are a mixture of volatile organic and inorganic contaminants (for example, Al, Cd, Pb, Hg, As, Cl) and are removed after the cyclone by a scrubber. The dust is separated by the cyclone and fed back to the feed system. The dust may also contain some of the inorganic contaminants and a small purge may be used to keep said contaminants from concentrating in the feed. FIG. 2 does not show the heat integration as this will be shown in subsequent drawings.

Figure 3:
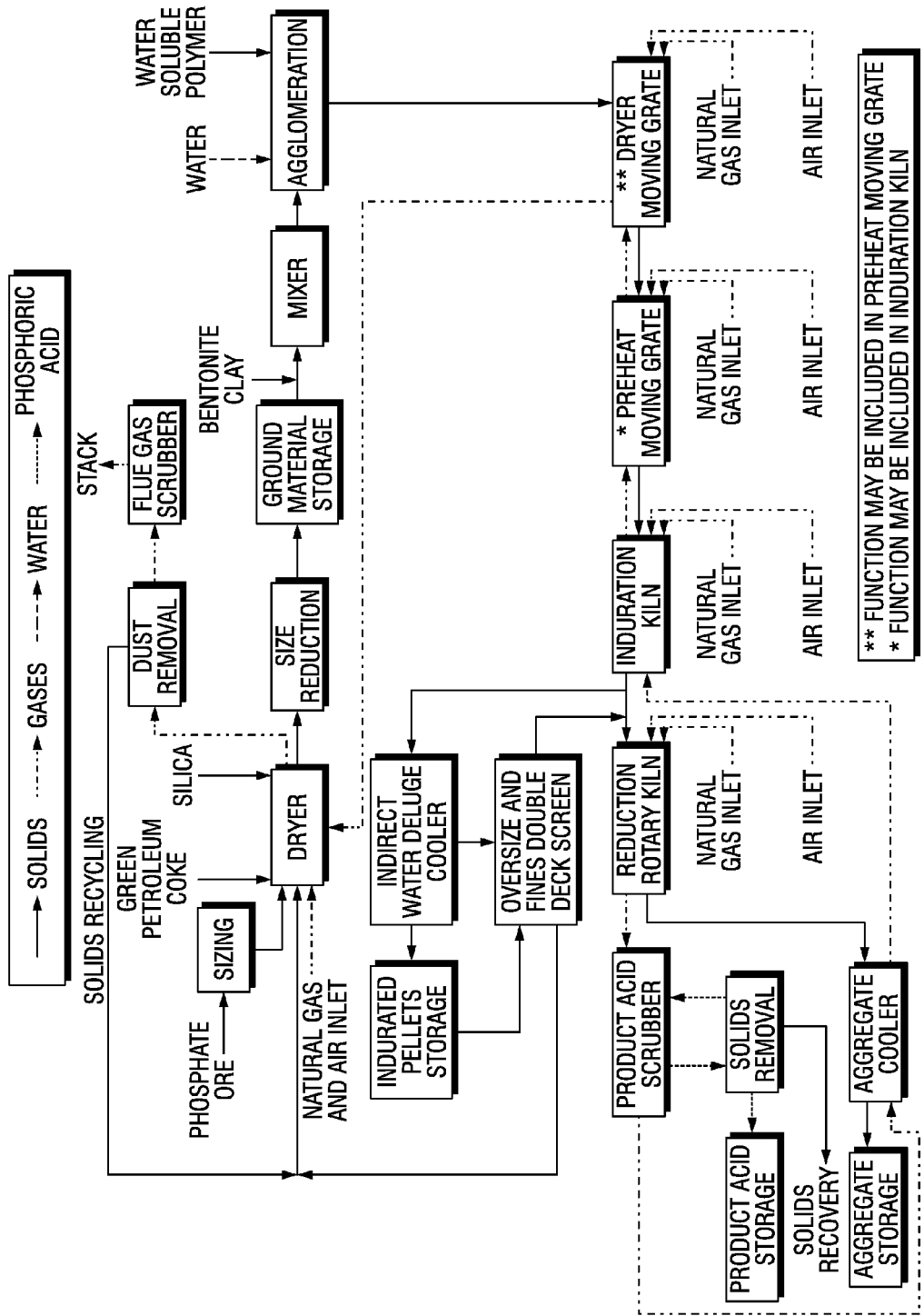
FIG. 3 shows a flowsheet for moving grate system (dryer/pre heater), induration and reduction kilns with heat recovery.

A variation on FIG. 2 is shown in FIG. 3 and is to add a high temperature PRE HEAT MOVING GRATE section to the DRYER MOVING GRATE. Part of this variation is maintaining a reducing environment in the grate section. The heat transfer gas composition may be reducing and contain little oxygen so the carbon in the agglomerate is not oxidized. The reducing environment can be achieved by recycling the off-gas leaving the PRODUCT ACID SCRUBBER back to the AGGREGATE COOLER where the heated gas is fed to the INDURATION KILN and then to the PREHEAT MOVING GRATE, then the DRYER MOVING GRATE and finally the ROTARY DRYER. The AGGREGATE COOLER is a gas-solids heat exchanger capable of utilizing reducing gas, air, or inert gas to cool the kiln discharge solids. Heat recovery from the AGGREGATE COOLER is utilized in various locations within the plant, enabling substantial heat integration. This flowsheet has multiple locations where dust can be removed if it is formed: from the gas stream leaving the INDURATION KILN through the HIGH TEMPERATURE DUST CYCLONE, the moving grates system, after the INDIRECT WATER DELUGE COOLER, and after the PRODUCT ACID SCRUBBER. After induration a cyclone-scrubber system may separate dust from induration kiln off-gas. As with all such systems a suitable bypass may be available when the cyclone-scrubber fails. The acid plant can serve this purpose, but may use a solids removals system to trap the dust protecting it from becoming inoperable. This solids removal system may also protect the acid plant from dust that forms in the reduction kiln. Gaseous contaminants are removed via the GAS ADSORPTION COLUMN before this stream is fed to the PRE HEAT MOVING GRATE. It should be noted that some dust carry-over may occur from a single stage cyclone which can lead to plugging of the adsorption column. To reduce or minimize this issue either a second stage cyclone can be added or a filter system or both. Then the acid plant off gas can be heated and recycled as reducing gas.

Figure 4:
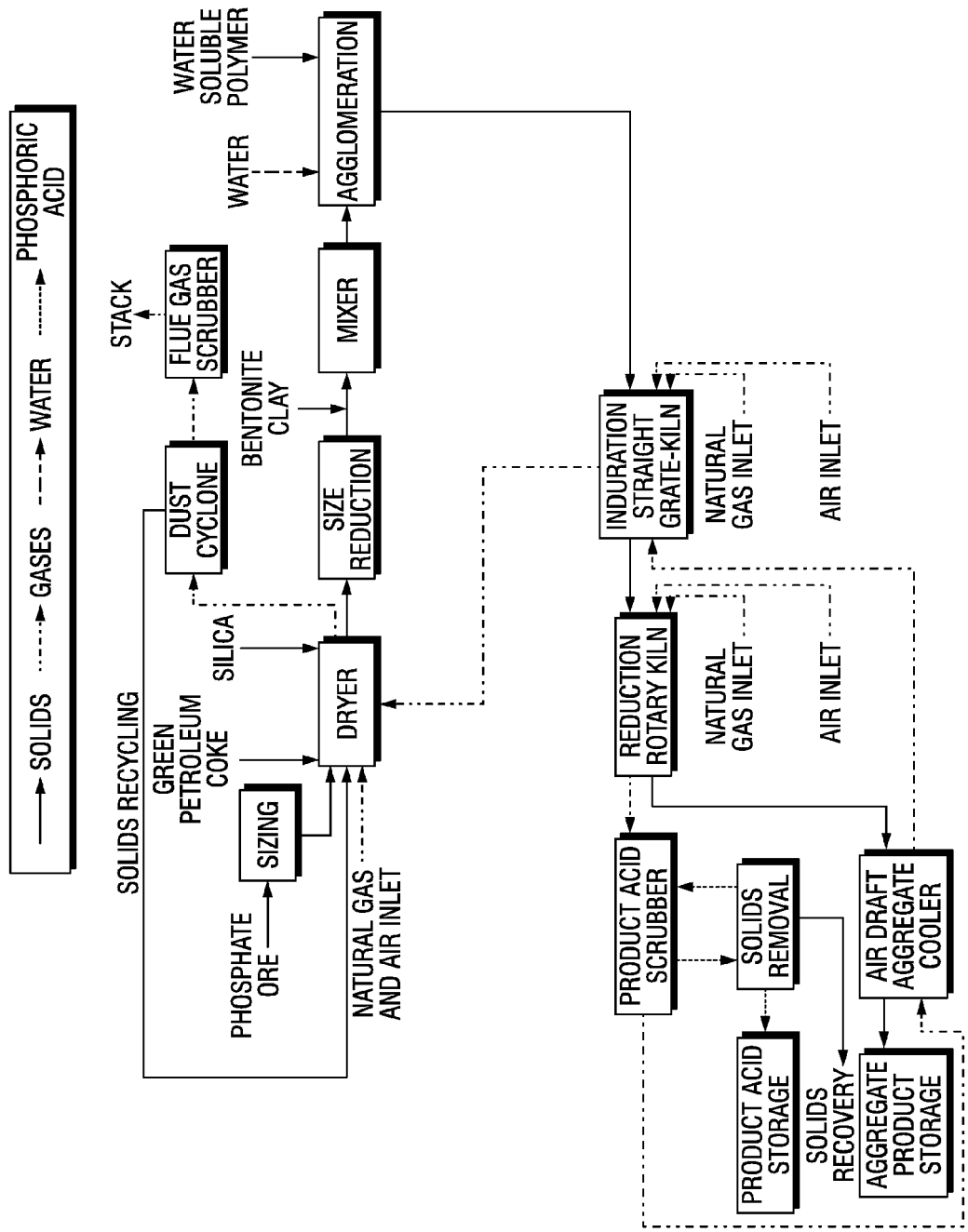
FIG. 4 shows a flowsheet for straight grate induration followed by reduction kiln with no intermediate storage.

FIG. 4 shows potentially the lowest capital design and uses a Straight Grate DRYER/Heater to indurate the agglomerates before they are fed directly to the PORTED ROTARY KILN. The grate section is a combination of a dryer and a heater. Again, the heat transfer gas composition in the grate section may be reducing and contain little oxygen to decrease carbon burnout. This is achieved by recycling the off-gas leaving the PRODUCT ACID SCRUBBER to the aggregate cooler where the heated gas provides heat to the Straight GRATE. Gaseous contaminants are removed in an adsorption column before the ROTARY DRYER. This design does not provide for intermediate indirect cooling or storage for the agglomerates.

Figure 5:
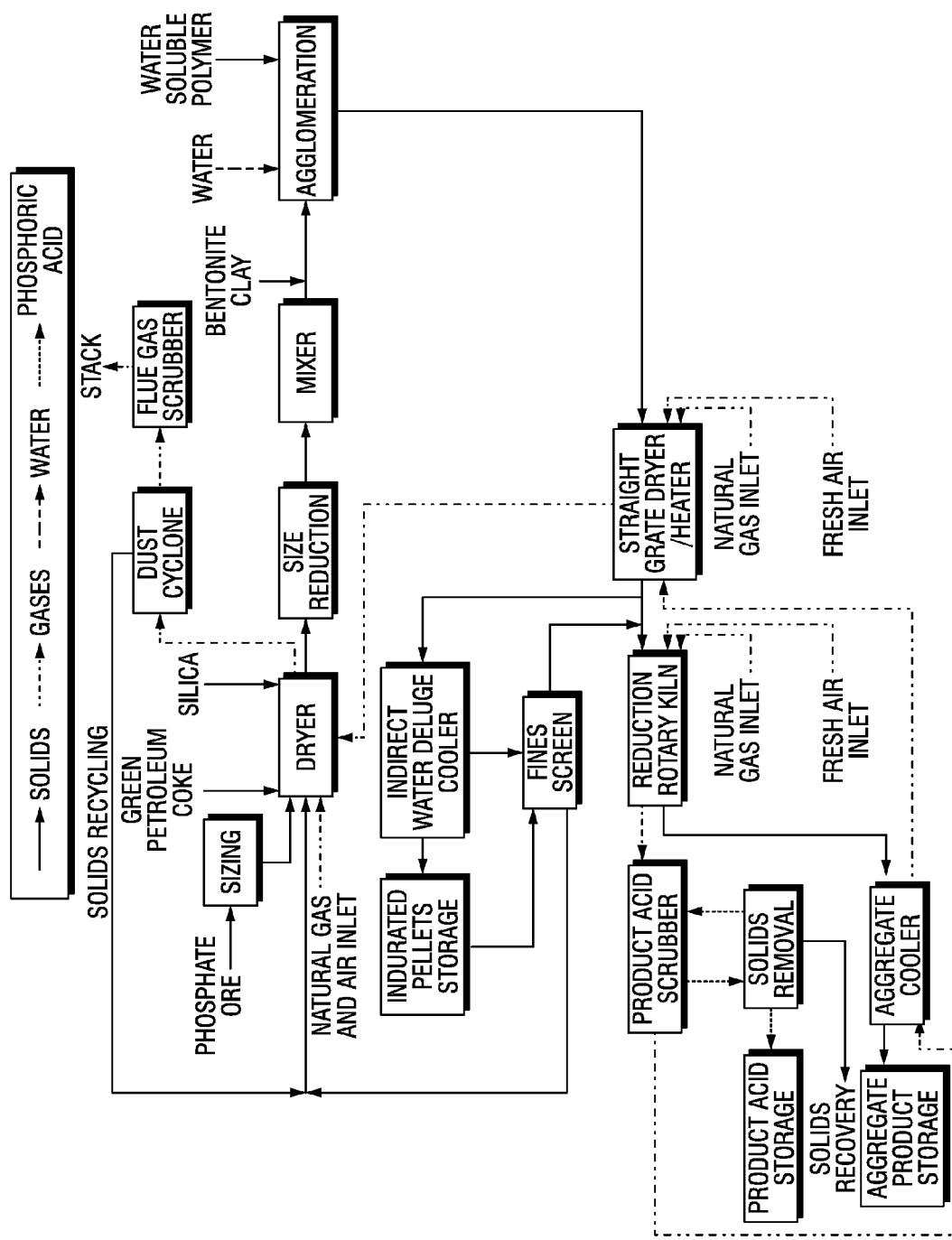
FIG. 5 shows a flowsheet for straight grate induration followed by reduction kiln with intermediate storage.

FIG. 5 is similar to FIG. 4 but adds an indirect cooler and intermediate storage. It also offers similar solids removal as described above for the flowsheet described in FIG. 3. Gaseous contaminants are removed in the same way as shown in FIG. 4.

Figure 6:
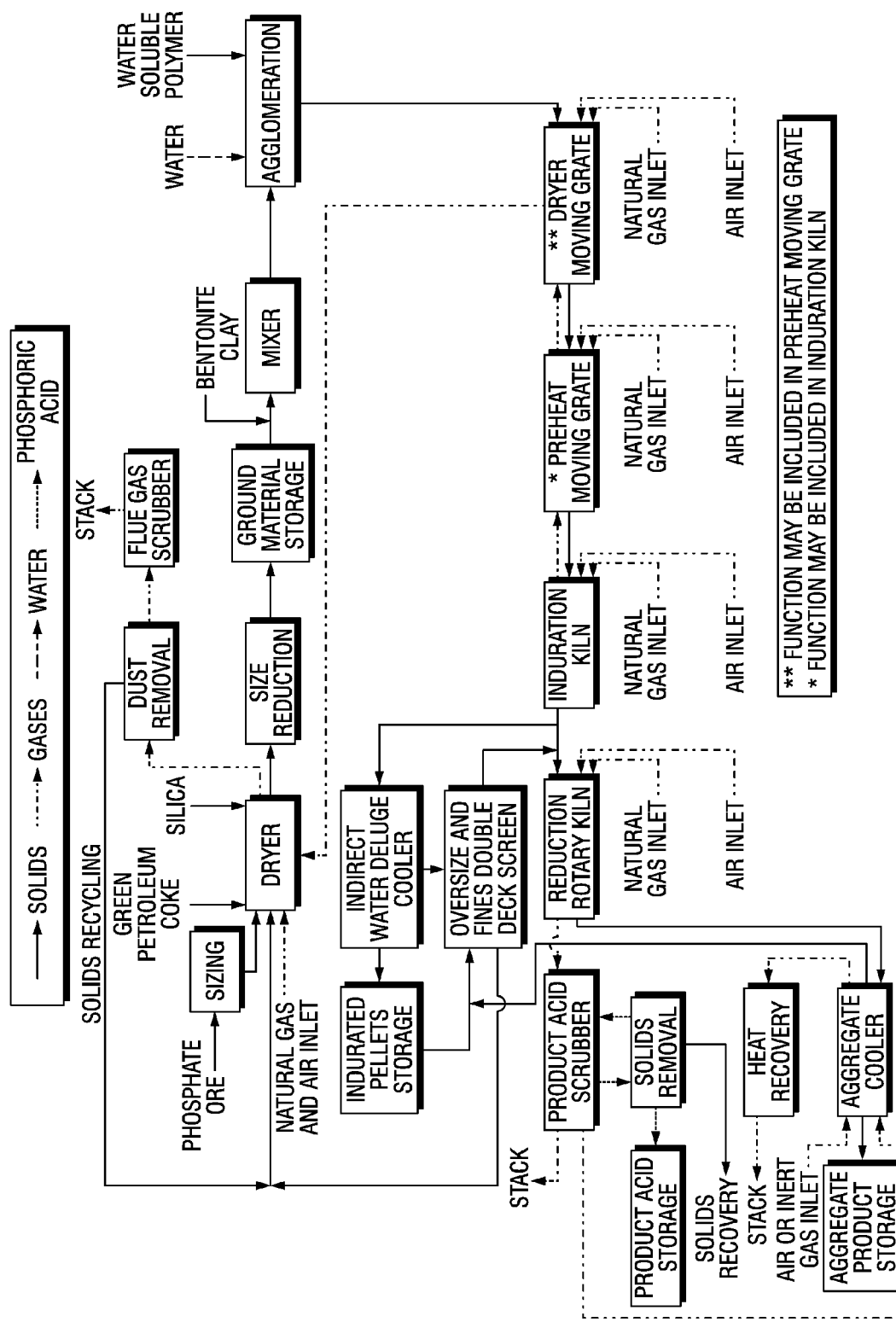
FIG. 6 shows a flowsheet for heat recovery using aggregate product recycle.

In FIG. 6 we show how to recover heat by recycling a portion of the aggregate product back to the reducing kiln. Indurated agglomerates report to the REDUCTION ROTARY KILN from three sources: 1) Directly from the INDURATION KILN; 2) From the INDURATION KILN through an INDIRECT WATER DELUGE COOLER followed by a DOUBLE DECK SCREEN; and 3) From the INDURATED PELLET STORAGE Through the DOUBLE DECK SCREEN. Note that in this case some of aggregate product can be recycled between the INDURATED PELLET STORAGE and the DOUBLE DECK SCREEN. The choice of feed routing and ratio of recycle aggregate to indurated feed depends upon agglomerate temperature and composition to control the temperature rise in the kiln.

Figure 7:
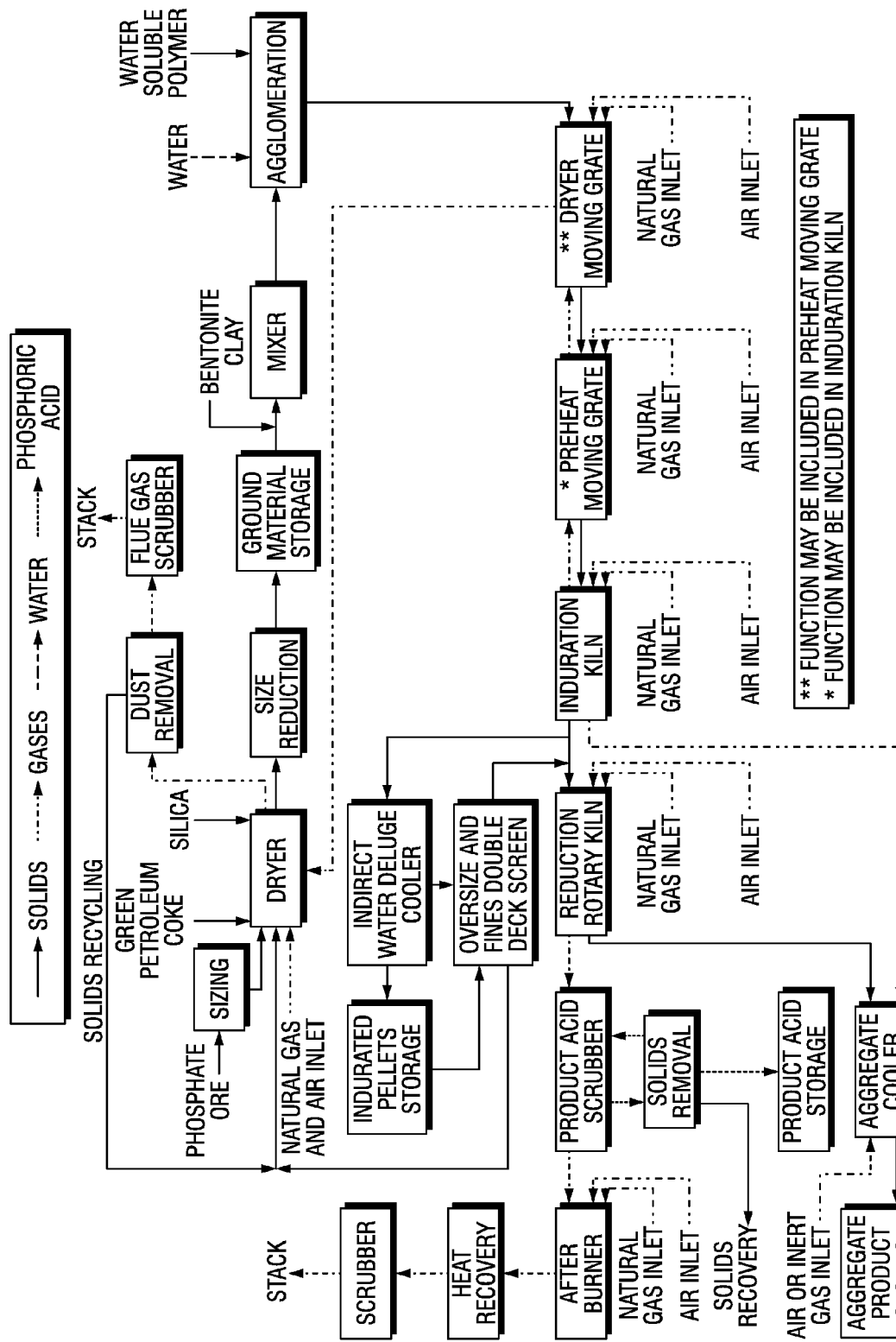
FIG. 7 shows a flowsheet for post product acid scubber afterburner.
Figure 8:
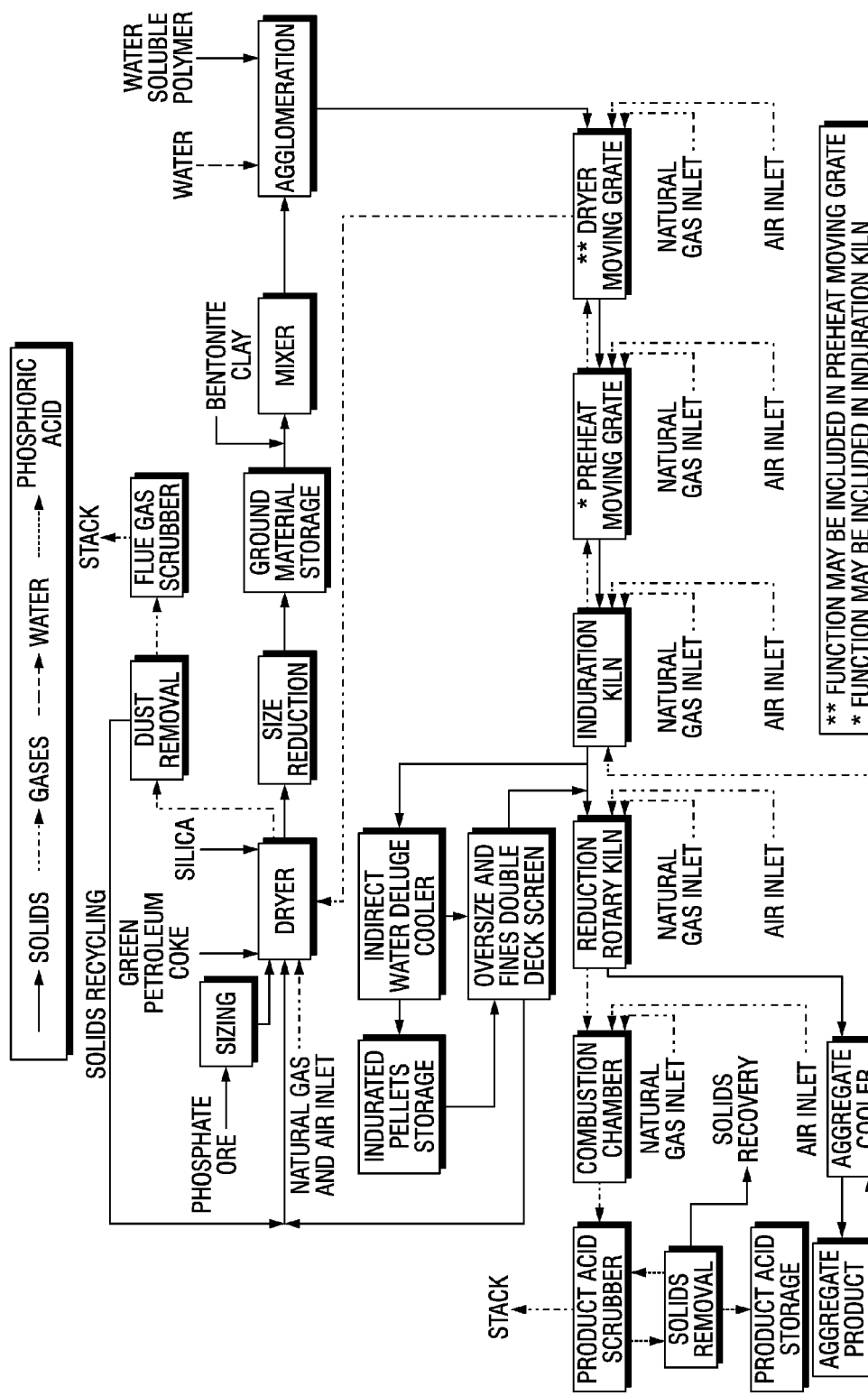
FIG. 8 shows a flowsheet for pre product acid scrubber combustion chamber.

FIGS. 7 and 8 provide alternatives for temperature control in the REDUCING KILN. FIG. 7 shows the introduction of a POST PRODUCT ACID SCRUBBER AFTERBURNER and FIG. 8 provides a PRE PRODUCT ACID SCRUBBER COMBUSTION CHAMBER. In both cases, when used for temperature control the Reducing Kiln is operated with stoichiometric deficient oxygen for complete combustion. The reducing atmosphere within the kiln decreases carbon burnout, which contributes to temperature control, reduces dust formation, and increases phosphate conversion yield.

In FIG. 7, REDUCTION KILN off gas reports to the PRODUCT ACID SCRUBBER (Acid Plant), which removes the phosphorus pentoxide from the gas producing Product Acid. Liquid filtration within the acid plant removes dust that is collected along with phosphorus pentoxide within the circulating liquid. Exhaust gas from the Product Acid Scrubber reports to an AFTER BURNER, which oxidizes non-combusted carbon monoxide and hydrogen to harmless carbon dioxide and water vapor. Afterburner discharge gas passes through Heat Recovery before being exhausted to atmosphere.

FIG. 8 shows that the REDUCTION KILN off gas reports to a COMBUSTION CHAMBER, which oxidizes non-combusted carbon monoxide and hydrogen to harmless carbon dioxide and water vapor. COMBUSTION CHAMBER off gas reports to the PRODUCT ACID SCRUBBER (Acid Plant), which removes the phosphorus pentoxide from the gas producing Product Acid. Liquid filtration within the acid plant removes dust that is collected along with phosphorus pentoxide within the circulating liquid. Exhaust gas from the PRODUCT ACID SCRUBBER is exhausted to atmosphere.

Figure 9:
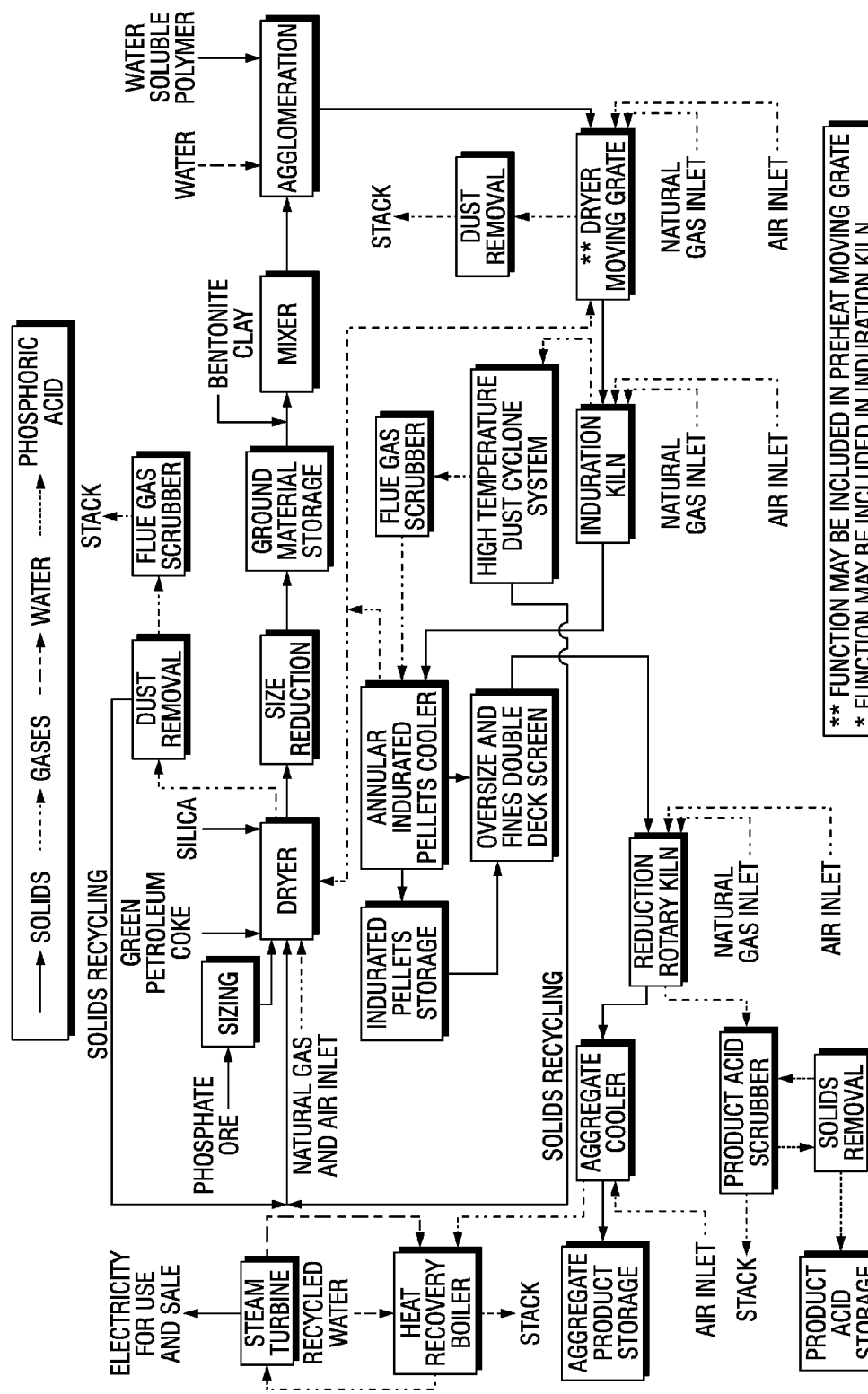
FIG. 9 shows a flowsheet for heat recovery with cogeneration plant.

FIG. 9 is similar to FIG. 2 except it shows heat integration, removal of contaminants, and cogeneration of electric power or heat. The temperature of the feed agglomerates on the dryer grate will not exceed 300 C to reduce or prevent carbon oxidation. This flowsheet shows how to split the plant into two independent sections to increase operability. The contaminants are removed after induration in a dust cyclone and a scrubber.

Figure 10:
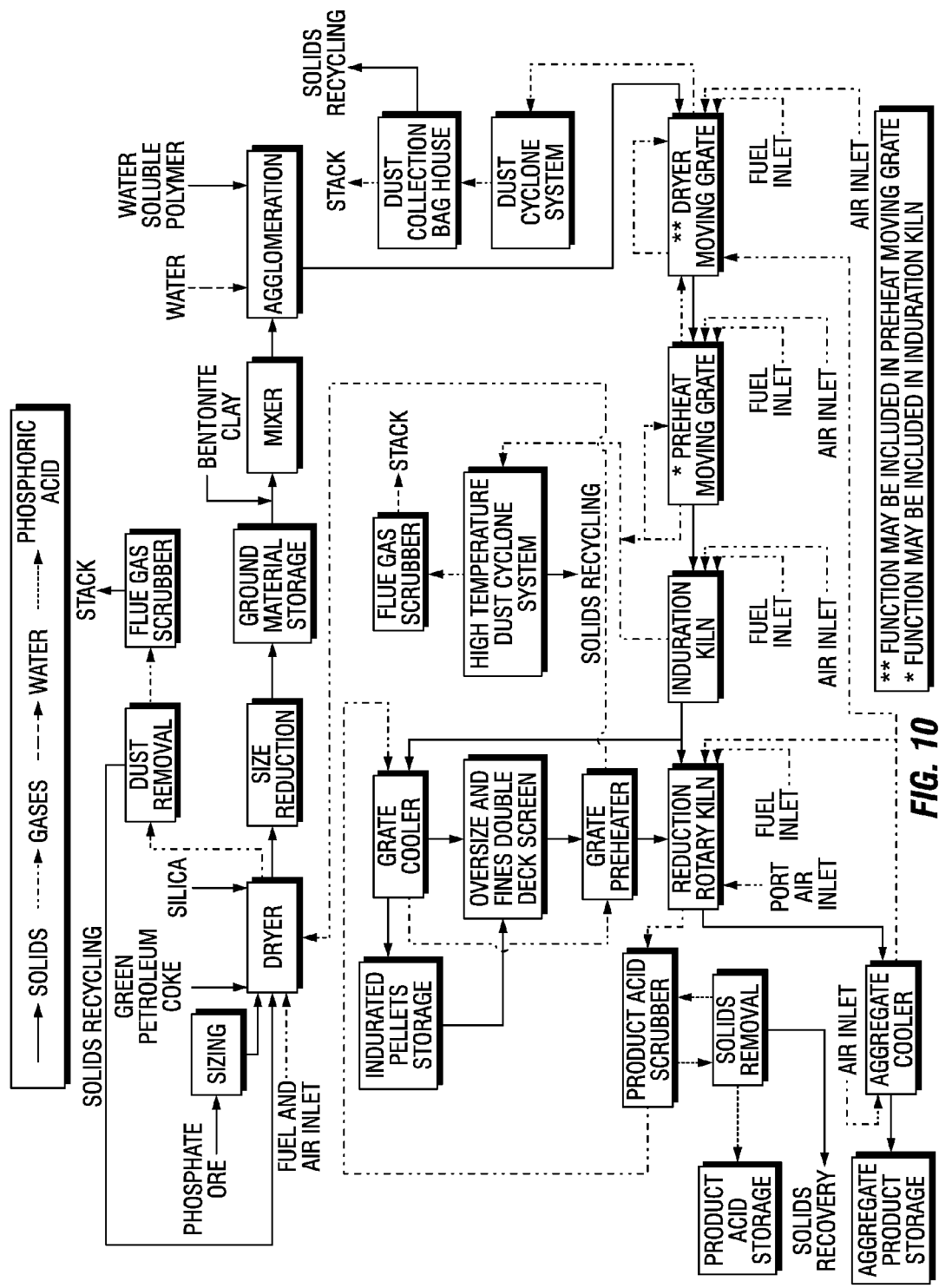
FIG. 10 shows a flowsheet for integrated heat recovery and grate kiln system.

FIG. 10 depicts the grate-kiln system with heat recovery and contaminant removal. This is similar to FIG. 3 and the high temperature section of the grate will need to be maintained in a reducing environment. To protect the grate components, the reducing gas may be fed down flow to the grate. The contaminant removal is accomplished via a flue gas scrubber.

FIGS. 2-10 show the addition of a water-soluble polymer (a water-insoluble polymer can be used but an additional mixing step is required) to the balling process step. Although beneficial, any of such systems may be operated without the polymer. The purpose of the polymer is to strengthen the agglomerate before it reaches induration temperatures in the induration and/or reduction kilns or induration grate, thereby decreasing dust formation. The polymer binder can be organic or inorganic. There are advantages to an inorganic polymer as some are stable at temperatures approaching induration temperatures. This gives the agglomerate a higher probability of maintaining integrity (decreased dust formation) before the induration reactions can occur near 1000 C. It can be added most conveniently in four ways: 1) the water-soluble polymer is mixed and dispersed throughout the solids mixture before the balling process; 2) the polymer is sprayed and dispersed during the balling process; 3) the agglomerates are coated after they are formed; or 4) a combination of any of the former. The agglomerates laden with polymer leaves the balling process and is fed to a grate dryer where the polymer reaction occurs at temperatures above 40 C strengthening the agglomerate.

A polymer can also be added to the original flowsheet described in the Megy patent. The polymer-strengthened agglomerate holds the agglomerate together long enough to reduce dust before the agglomerate is strengthened further by induration (agglomerate reaches temperatures >930 C<1125 C) in the front portion of the reduction kiln before the phosphorus ore reduction reaction temperature 1180 C is reached.

FIGS. 2-10 have the following process steps in common: sizing/screening of the feed materials, drying followed by size reduction to the desired particle size, mixing and finally an agglomeration step. There are variations on these steps which includes: separate grinding of the feed constituents followed by mixing, combining drying and size reduction in one step if gas swept mills are used, and co-grinding two or more of the feed constituents followed by mixing.

Accordingly, one example of a phosphorous pentoxide producing method includes forming pre-feed agglomerates containing phosphate ore particles, carbonaceous material particles, and silica particles and heating the pre-feed agglomerates in a reducing or inert atmosphere to an induration temperature from above 900 C to less than 1180 C and maintaining the induration temperature for 15 minutes or more. Pre-feed agglomerates may be green or dried agglomerates. The method includes forming feed agglomerates and increasing a compression strength of the feed agglomerates to above 25 $lb_f$ using the heating, the feed agglomerates exhibiting a calcium-to-silica mole ratio less than 1 and a silica-to-(calcium+magnesium) mole ratio greater than 2. A reducing kiln bed is formed using the feed agglomerates, kiln off-gas is generated, and phosphorous pentoxide is collected from the kiln off gas.

By way of example, the crush strength may be above 50 $lb_f$. The heating may occur in an induration kiln selected from among a tunnel kiln, a rotary co-current kiln, and a rotary counter-current kiln. Instead or in addition, the heating may occur in a grate heater. The induration temperature may be from 930 to 1125 C. Also, the induration temperature may be maintained for 30 to 90 minutes.

The method may further include adding over bed air through a plurality of ports along the bed length. The over bed air may enter kiln freeboard through a plurality of standpipes extending from respective ports to a height above the bed. The method may further include pre-heating the pre-feed agglomerates in a grate heater to a pre-heat temperature from 950 C to less than 1180 C before the heating at the induration temperature, which occurs in an induration kiln. The pre-feed agglomerates may further contain clay particles. The method may further include preparing the phosphate ore particles, carbonaceous material particles, clay particles (if present), and silica particles such that 80% or more exhibit a size less than 200 mesh. The method may further include scrubbing the kiln off-gas in a product acid scrubber and generating a scrubber off-gas, making the scrubber off-gas reducing, and the pre-heating in the grate heater using the reducing scrubber off-gas. The scrubber off-gas may be heated by the kiln discharge solids, such as in the aggregate cooler discussed above in relation to FIG. 3. The pre-feed agglomerates may contain one or more contaminants selected from the group consisting of Al, As, Cd, Cl, Pb, and Hg and the method may further include decreasing a concentration of the contaminants in the feed agglomerates using the heating when compared to the pre-feed agglomerates.

Another example of a phosphorous pentoxide producing method included forming green agglomerates containing phosphate ore particles, carbonaceous material particles, silica particles, and a polymer and drying the green agglomerates at a drying temperature from 40 to 300 C, the dried agglomerates exhibiting a compression strength above 25 $lb_f$. The method includes heating the dried agglomerates in a reducing or inert atmosphere to an induration temperature from above 900 to less than 1180 C and maintaining the induration temperature for 15 minutes or more. The method also includes forming feed agglomerates and increasing a compression strength of the feed agglomerates to above 50 $lb_f$ using the heating, the feed agglomerates exhibiting a calcium-to-silica mole ratio less than 1 and a silica-to-(calcium+magnesium) mole ratio greater than 2. A reducing kiln bed is formed using the feed agglomerates, kiln off-gas is generated, and phosphorous pentoxide is collected from the kiln off gas.

By way of example, the crush strength may be above 100 lbf. The induration temperature may be from 950 to 1100 C and maintained for 30 minutes or more. The green agglomerates may further contain clay particles. The drying temperature may be from 40 to 150 C. The polymer may contain a compound selected from among acrylics, silicones, cross-linkable polyimides, epoxies, silicates of sodium, potassium, or lithium, and a combination of organic and inorganic polymers. The polymer may contain $Na_2(SiO_2)_nO$. When a silicate polymer is used, incorporating clay may be avoided. The dried agglomerates may contain one or more contaminants selected from the group consisting of Al, As, Cd, Cl, Pb, and Hg and the method may further include decreasing a concentration of the contaminants in the feed agglomerates using the heating when compared to the dried agglomerates. The method may further include preparing the phosphate ore particles, carbonaceous material particles, clay particles, and silica particles such that 80% or more exhibit a size less than 200 mesh.

Still another example of a phosphorous pentoxide producing method includes extruding a material to form green agglomerates containing phosphate ore particles, carbonaceous material particles, silica particles, and 2 to 5 wt % (dry basis) clay particles. The method includes drying the extruded, green agglomerates at a drying temperature from 40 to 150 C, the dried agglomerates exhibiting a compression strength above 50 $lb_f$ and heating the dried agglomerates in a reducing or inert atmosphere to an induration temperature from above 900 to less than 1180 C and maintaining the induration temperature for 15 minutes or more. The method includes forming feed agglomerates and increasing a compression strength of the feed agglomerates to above 200 $lb_f$ using the heating, the feed agglomerates exhibiting a calcium-to-silica mole ratio less than 1 and a silica-to-(calcium+magnesium) mole ratio greater than 2. A reducing kiln bed is formed using the feed agglomerates, kiln off-gas is generated, and phosphorous pentoxide is collected from the kiln off gas.

By way of example, the induration temperature may be from 1000 to 1100 C and maintained for 30 to 90 minutes. The method may further include preparing the phosphate ore particles, carbonaceous material particles, clay particles, and silica particles such that 80% or more exhibit a size less than 325 mesh. The dried agglomerates may contain one or more contaminants selected from the group consisting of Al, As, Cd, Cl, Pb, and Hg and the method may further include decreasing a concentration of the contaminants in the feed agglomerates using the heating when compared to the dried agglomerates.

Example 1—Laboratory Data A

Two lab sequences were run as follows:
1) Compare dry pellet strengths of Calcined Coke formulations (with High Magnesium [Mag] Pebble) at −230 mesh and −325 mesh grind at room temperature and after firing for 30 minutes at 1000 C. Raw material were lab ground Dierks tailings, Hi Mag Pebble, Calcined Pet Coke, and 1% bentonite ground to −230 mesh and to −325 mesh; R=2.5. Dierks tailings are fill material from a sand tailings disposal site in Fort Meade, Fla.
2) Compare dry pellet strengths of Calcined Coke (with High Mag Pebble) at −230 mesh and −325 mesh grind and a $CaCO_3$ formulation at −230 mesh grind at 400, 600, 700, 800, 900 and 1100 C. One percent bentonite was added to the −325 mesh sample and no bentonite was added to the −230 mesh sample. Four percent bentonite was used to develop sufficient strength in the $CaCO_3$/sand/coke formulation.

Agglomerate Preparation

The formulation for the agglomerates and preparation was as follows:
1) −230 & −325 mesh calcined petroleum coke formulation—

1 part High Mag Pebble, 1.54 parts Dierks tailings, and 0.247 parts calcined coke. Three components ground in lab mortar and pestle to pass 230 mesh screen (first sample) or 325 mesh screen (second sample). 1% bentonite added prior to mixing with 14% by weight water and making the pellets in ½ in. die under 300 $lb_f$ pressure. Pellets were weighed and measured and then dried and weighed and measured again. Some agglomerates crushed without firing and exhibited a green pellet strength less than 20 $lb_f$, the rest fired at selected temperatures in the lab tube furnace in a boat with the tube purged with nitrogen. Fired pellets were weighed, measured and crushed.

2) $CaCO_3$ formulation—
1 part lab pure $CaCO_3$, 9 parts Dierks tailings, 1 part green coke, and 0.4 parts bentonite were lab ground to pass 230 mesh sieves. Mixed with 14% water and formed into ½ in. diameter pellets under 300 $lb_f$ pressure. The pellets were then treated as above.

Results

Figure 11:
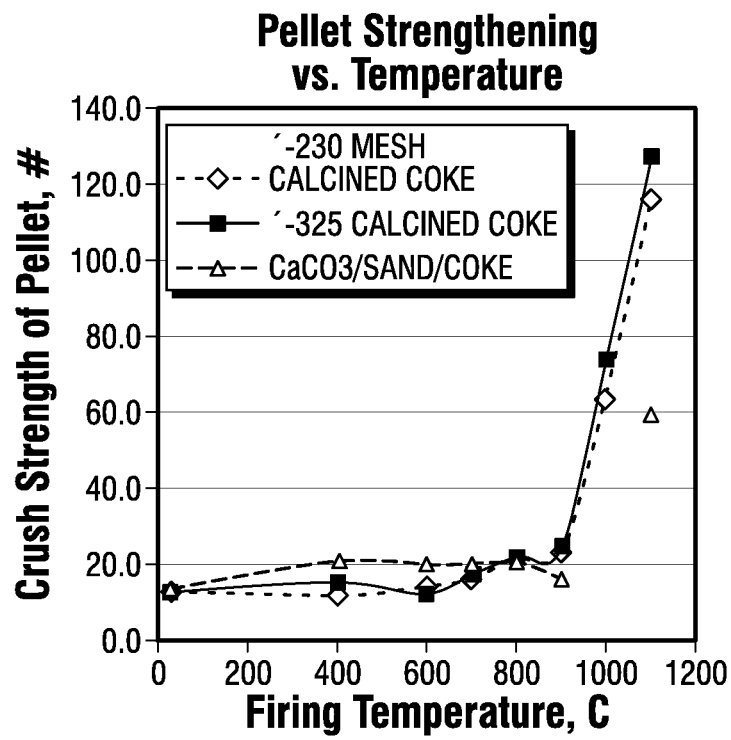
FIG. 11 shows a chart of strength of three types of pellets indurated over a range of temperatures for 30 minutes each showing significant strengthening at 1000-1100 C. $CaCO_3$ pellets were run to elucidate strengthening mechanism.

The results from the two sequences are reported together. The major observation is that the pellet (agglomerate) strength was not enhanced until temperature approached 1000 C as shown in FIG. 11.

Figure 12:
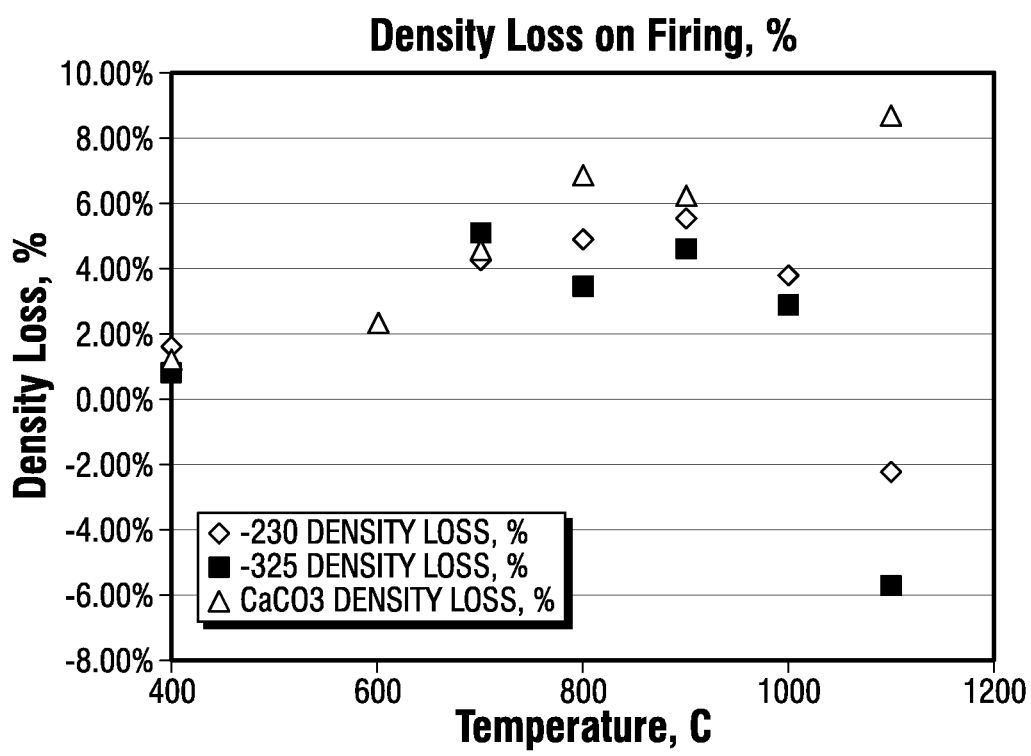
FIG. 12 shows a chart of density increases for pellets indurated at 1000-1100 C corresponding to pellet strength increases. Density of $CaCO_3$ does not increase at 1100 C.

The variation of agglomerate density with firing temperature (FIG. 12) was also measured which showed that the strengthening of the agglomerate at 1000-1100 C was accompanied by a significant density increase for the −230 and −325 formulations, but not the $CaCO_3$ formulation.

Figure 13:
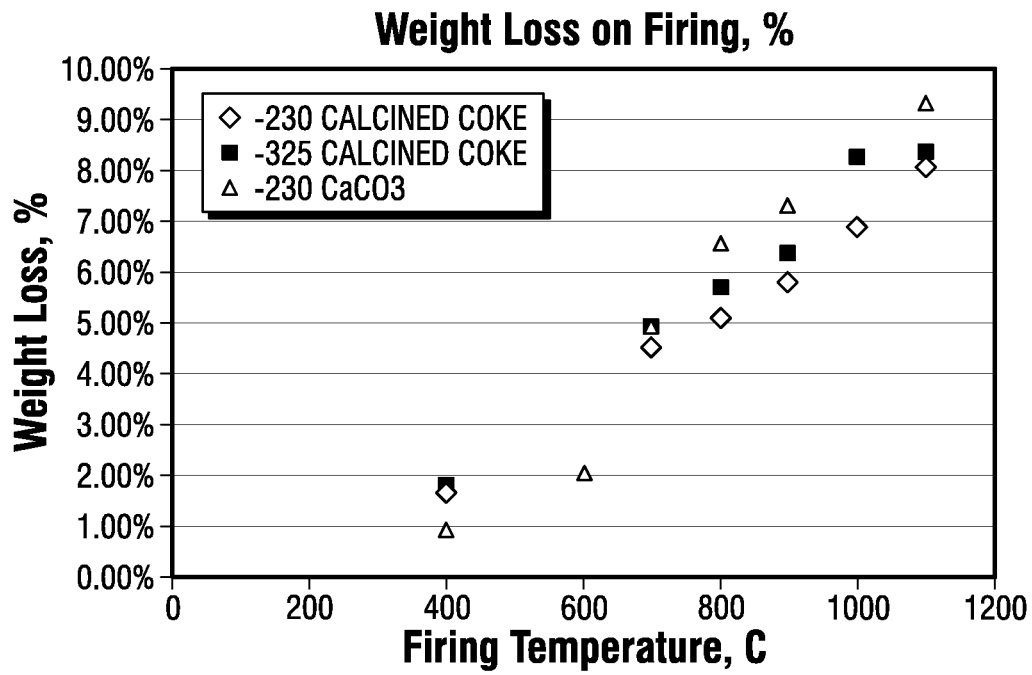
FIG. 13 shows a chart of the ore pellets lost weight with increasing temperature of firing.
Figure 14:
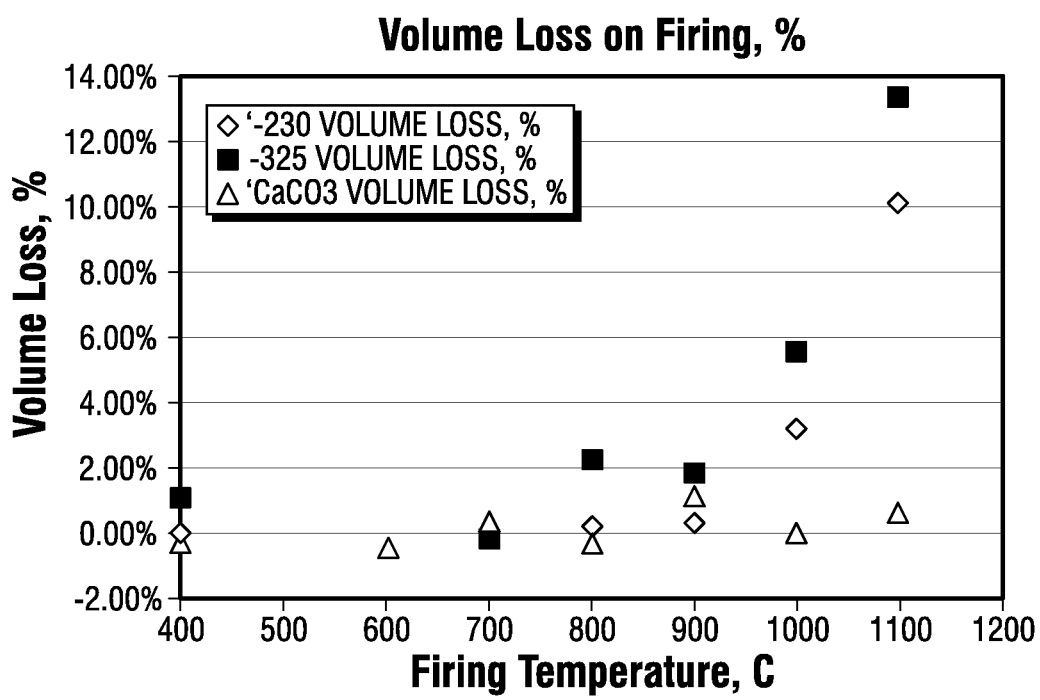
FIG. 14 shows a chart of the ore pellets lost volume at 1000 and 1100 C, but the $CaCO_3$ did not, consistent with the density changes.

Weight loss in the pellets upon firing and the change in volume of the agglomerates versus temperature is shown in FIGS. 13 and 14. The ore agglomerates lost considerable volume at 1000 and 1100 C, but the $CaCO_3$ agglomerates did not. All of the agglomerates had weight loss that increased with agglomerate firing temperature.

Since the $CaCO_3$ agglomerate and the ore pellets develop strength at the same temperature, the data suggest that the reaction of $CaCO_3$ with $SiO_2$ occurs at about 950 C (known to react at a reasonable rate at 930 C) and is involved in the strengthening of the pellets. The reaction involved is:

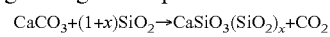
$$CaCO_3+(1+x)SiO_2 \rightarrow CaSiO_3(SiO_2)_x+CO_2$$

Example 2—Laboratory Data B

Table 1 provides data on agglomerate hardening as a function of time and temperature. Five agglomerates of composition and size shown in Table 1 were placed in a crucible and heated in a Thermolyne 47900 lab furnace and held at temperatures between 1000 and 1100 C under a nitrogen purge of 10 ft$^3$/hr. Initial furnace temperature was set at approximately 350 C and then ramped up to the desired temperature and held for the time listed in Table 1. The agglomerates were then removed from the crucible and air cooled before compression strength was measured.

TABLE 1

Agglomerate strength as a function of temperature and time.
Five agglomerates of 5/16 in. diameter per run and dry basis composition of approximately 55.7% SiO$_2$, 20.4% CaO, 10.9% P$_2$O$_5$, 1.2% MgO, 7.5% pet coke, 2.1% clay with 1.1% each of Fe$_2$O$_3$ and Al$_2$O$_3$.

| Temperature, C. | Time, min. | Ball Strength, lbf | Ball Strength Average, lbf |
|---|---|---|---|
| 1000 | 30 | 24 30 12 27 40 | 27 |
| 1000 | 60 | 31 23 37 50 35 | 35 |
| 1000 | 90 | 19 35 26 36 43 | 32 |
| 1025 | 30 | 48 27 31 36 31 | 35 |
| 1025 | 60 | 32 63 65 23 48 | 46 |
| 1025 | 90 | 47 45 47 45 48 | 46 |
| 1050 | 30 | 52 79 58 103 108 | 80 |
| 1050 | 60 | 82 72 55 56 71 | 67 |
| 1050 | 90 | 68 52 64 43 65 | 58 |
| 1075 | 30 | 72 118 80 87 105 | 92 |
| 1075 | 60 | 48 68 64 54 47 | 56 |

Example 3—Laboratory Data C

The use of an organic polymer resin, 43-ACRYLIC/IND POWDER, CODE WC66-6707M, Supplier: PPG Industries, to strengthen the agglomerates before induration is shown in Table 2. Seventeen agglomerate samples were prepared 5 with polymer and 12 without by thoroughly mixing the ingredients (shown below) compacted in a hydraulic press to 300 lb$_f$, dried at 100 C for 12 minutes, then compression tested. A known composition was prepared for a baseline comparison that contained no clay and no organic polymer. The average compression strength between the agglomerates with organic polymer and without organic polymer was 64.8 lb$_f$ versus 15.2 lb$_f$, respectively.

Figure 17:
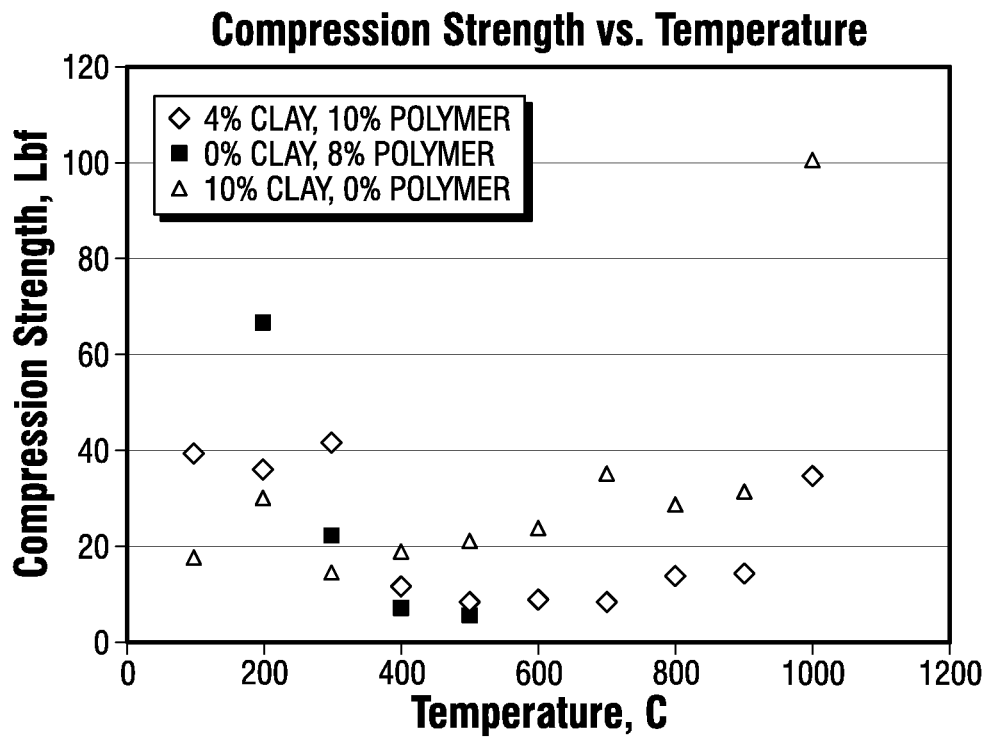
FIG. 17 shows a chart of compression strength versus induration temperature for varying organic polymer compositions.

The organic polymer addition increased the compression strength significantly when dried at 100 C. FIG. 17 shows the temperature dependence on compression strength for three different agglomerate compositions prepared similarly to the samples above: 1) with 10% clay no polymer; 2) 8% polymer with no clay; and 3) 10% polymer and 4% clay. The no polymer case shows compression strength is independent of temperature until induration temperatures are reached. All the samples containing polymer lost compression strength to less than 15 lb$_f$ at temperatures above 300 C. Experience operating the demonstration plant kiln showed that agglomerate breakage and dust formation will likely begin in the kiln after the agglomerates lose compression strength below 25 lb$_f$ at temperatures above 300 C. Therefore, the beneficial polymer binder is one that is stable until induration temperatures—approximately 930 C. Since no organic polymer identified thus far was stable for sustained periods above 500 C, only inorganic polymers are believed to achieve the desired result. Example 9 shows the results for an inorganic polymer. A combination of an organic and inorganic polymer binders may be beneficial since the organic polymer would give excellent strength at low temperatures and an inorganic polymer the strength required at high temperatures.

TABLE 2

Comparison of agglomerates with and without an organic polymer additive.
Agglomerate Composition without Polymer: 57.1% SiO$_2$, 20.4% CaO, 11.2% P$_2$O$_5$, 8.3% pet coke with approximately 1% each of MgO, Fe$_2$O$_3$ and Al$_2$O$_3$ dry basis.
Agglomerate Composition with polymer added: 51.5% SiO$_2$, 18.4% CaO, 10.1% P$_2$O$_5$, 7.4% pet coke, 10% polymer with approximately 0.9% each of MgO, Fe$_2$O$_3$ and Al$_2$O$_3$ dry basis.

| | Compression Strength, lbf | Compression Strength Average, lbf |
|---|---|---|
| Agglomerate Composition without Polymer | 17.9 15.0 17.8 19.5 15.3 12.7 13.8 14.5 14.1 13.0 12.8 15.7 | 15.2 |
| Agglomerate with 10% Polymer no clay | 70.6 50.1 55.8 73.1 74.2 | 64.8 |

Example 4—Demonstration Plant Data A

The kiln was operated at 982 C as measured by the hottest spot on the kiln brick with an approximate residence time of one hour. Dried green balls were fed with typical quality; ≈20+ lb$_f$ compression strength and 50%+3/8 in. sizing. Samples were taken directly off of the kiln discharge and allowed to air cool within a sample pan. After cooling, the compression strength averaged 84 lb$_f$. These balls were tumbled and the dust generated was less than 0.2%. The test was repeated but at a slightly higher temperature of ≈1038 C and similar feed conditions and sampling to the above test. The compression strength averaged 105 lb$_f$. After tumbling, dust was still below 0.2% on average. These balls had the appearance of a dark grey interior with a very thin outer, lighter grey shell. Because the balls were exposed to oxygen, some carbon may have burned out which could reduce yields. These balls were tested in the lab for yield and 85% was achieved.

Example 5—Demonstration Plant Data B

Figure 15:
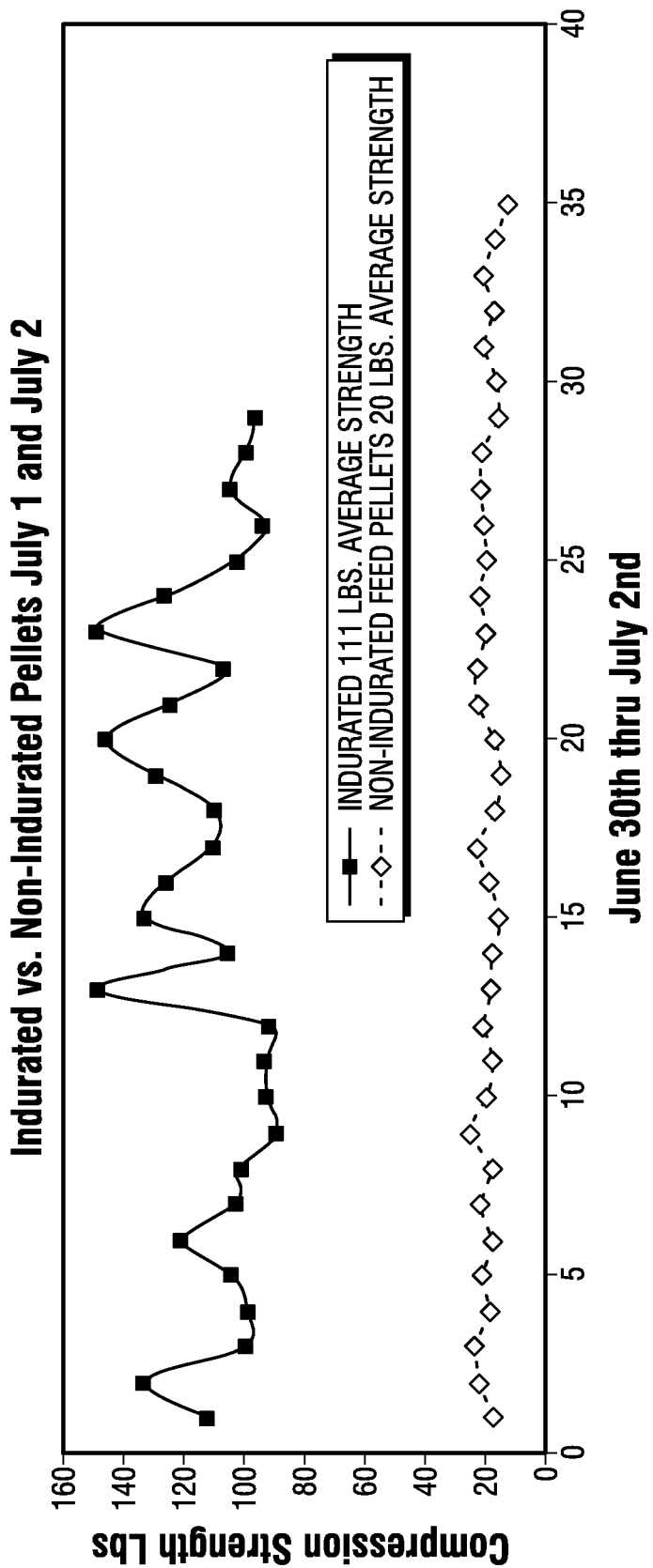
FIG. 15 shows a chart of compression strength versus induration run time.
Figure 16:
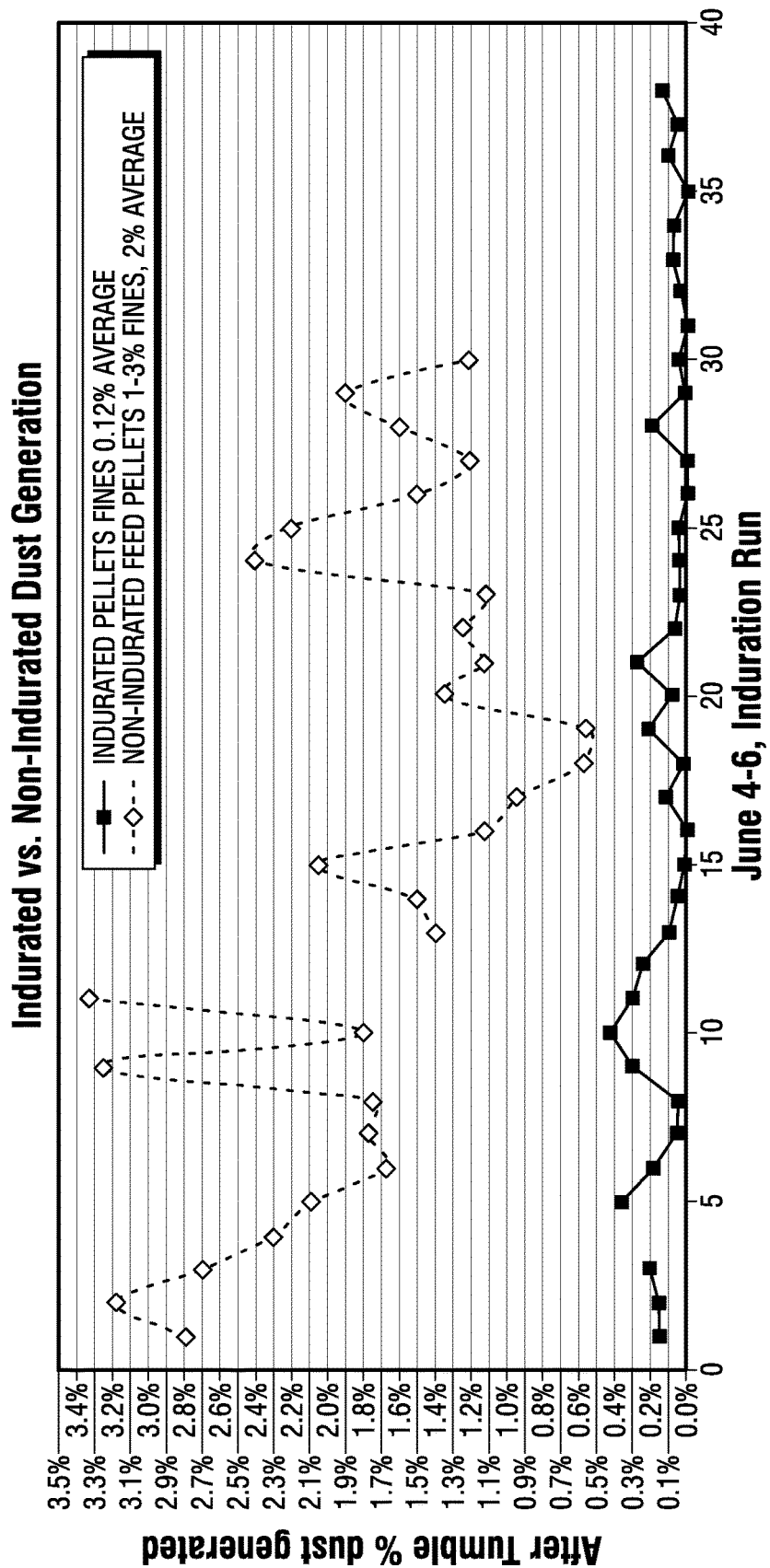
FIG. 16 shows a chart of percent dust generated after tumble test versus induration run time (hours).

FIGS. 15 and 16 show the effects of induration on the agglomerate (ball/pellet) compression strength and dust formation versus non-indurated balls, respectively. The results generated were from two different plant tests, run under nominally the same operation conditions: kiln temperature at hot spot 1038 C, feed rate 5-6 tons/hour, solids residence time 45-60 minutes, off-gas oxygen concentration 6-8%. FIG. 15 shows the compression strength of indurated agglomerate is increased by over a factor of 5 versus non-indurated agglomerate. FIG. 16 shows that the propensity to dust is reduced by an order of magnitude by indurating agglomerates. Sampling the feed balls to the kiln and balls that exit the kiln after induration and then run in a tumble tester generated the data in FIG. 16.

Example 6

Table 3 shows the change in contaminant concentration in the feed agglomerates before and after induration at 1080 C for 30 and 60 minutes. The feed agglomerates were prepared in a laboratory-balling disk (36 cm diameter) and then dried at approximately 100 C. The agglomerates were then placed in a crucible and heated in a furnace with a nitrogen sweep for 30 minutes and 60 minutes. The concentration of Arsenic was reduced by a factor of 3, Cadmium was reduced from 1.47 mg/kg to undetectable, Lead was reduced from 4.25 mg/kg by a factor of 7.8 after 30 minutes and to undetectable limits after 60 minutes, Aluminum was reduced in half, Mercury was reduced to undetectable limits after 60 minutes, and Chloride was reduced by a factor of 15 after 60 minutes.

TABLE 3

Selected element concentration in feed agglomerates and concentration in the agglomerate after induration at 1080 C. for 30 and 60 minutes.

| Analyte | Units | Feed Agglomerates | 30 minutes Induration | 60 minute Induration |
|---|---|---|---|---|
| Arsenic | mg/kg | 9.29 | 3.15 | 2.88 |
| Barium | mg/kg | 30 | 36.7 | 48.7 |
| Cadmium | mg/kg | 1.47 | 0.07 U | 0.07 U |
| Chromium | mg/kg | 24.1 | 22 | 22.9 |
| Lead | mg/kg | 4.25 | 0.54 | 0.16 U |
| Selenium | mg/kg | 0.80 U | 0.80 U | 0.80 U |
| Silver | mg/kg | 0.06 U | 0.06 U | 0.06 U |
| Mercury | mg/kg | 0.023 I | 0.022 I | 0.011 I |
| Aluminum | mg/kg | 6,330 | 2,910 | 3,370 |
| Chloride | mg/kg | 61.9 | 2.57 | 3.97 |

I - The reported value is between the laboratory method detection limit and the laboratory practical quantitation limit.
U - The compound was analyzed for but not detected. The value shown is the laboratory method detection unit.

Example 7

Table 4 shows the change in contaminant concentration in the feed agglomerates before and after induration at 950 C for 15 and 60 minutes. The feed agglomerates were prepared in a laboratory-balling disk (36 cm diameter) and then dried at approximately 100 C. The agglomerates were then placed in a crucible and heated in a furnace with a nitrogen sweep for 15 minutes and 60 minutes. The concentration of Arsenic was reduced by a factor of 1.5, Cadmium was reduced from 1.57 mg/kg to undetectable in 60 minutes, Lead was reduced from 5.7 mg/kg by a factor of 4 after 15 minutes and a factor of 6 after 60 minutes, and Aluminum by a factor of 1.4. A comparison between Table 3 and Table 4 indicates higher temperatures facilitate contaminant removal.

TABLE 4

Selected element concentration in feed agglomerates and concentration in the agglomerate after induration at 950 C. for 15 and 60 minutes.

| Analyte | Units | Feed Agglomerates | 15 minutes Induration | 60 minute Induration |
|---|---|---|---|---|
| Arsenic | mg/kg | 9.64 | 6.51 | 6.51 |
| Barium | mg/kg | 58.1 | 64.4 | 51.4 |
| Cadmium | mg/kg | 1.57 | 0.11 I | 0.07U |
| Chromium | mg/kg | 30.5 | 17.0 | 27.6 |
| Lead | mg/kg | 5.71 | 1.35 | 0.9 |
| Selenium | mg/kg | 0.80U | 0.80U | 0.80U |
| Silver | mg/kg | 0.06U | 0.06U | 0.06U |
| Aluminum | mg/kg | 6,120 | 4,650 | 4,250 |

I - The reported value is between the laboratory method detection limit and the laboratory practical quantitation limit.
U - The compound was analyzed for but not detected. The value shown is the laboratory method detection unit.

Example 8

Figure 18:
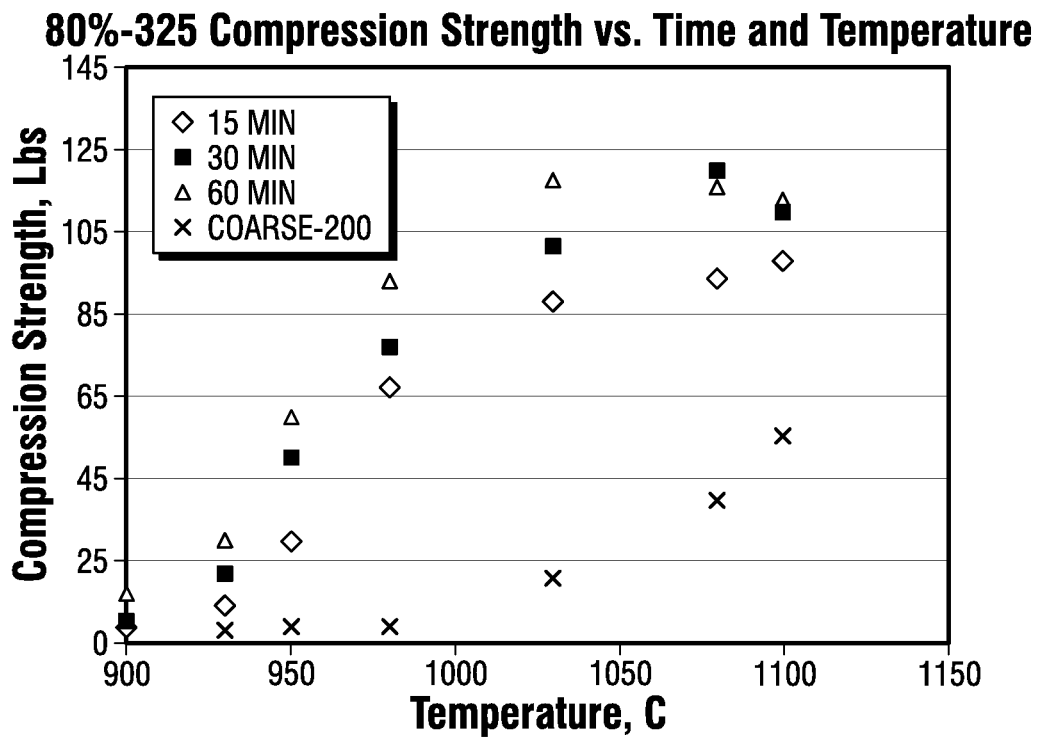
FIG. 18 shows a chart of compression strength versus induration temperature with induration time and agglomerate constituent grind size as parameters.

FIG. 18 shows compression strength of indurated agglomerates as a function of temperature with both times for induration and grind size of constituents of the agglomerates as parameters. Feed agglomerates were prepared similarly as in Examples 7 and 8. Results show the induration chemistry begins near 930 C for fine grind size (−325 mesh particles) and plateaus around 1100 C. Smaller grind size facilitates the induration chemistry, as coarse constituent grind size (−200 mesh particles) agglomerates do not indurate at temperatures below 1025 C. Induration compression strength improves with increasing induration time.

Example 9

Figure 19:
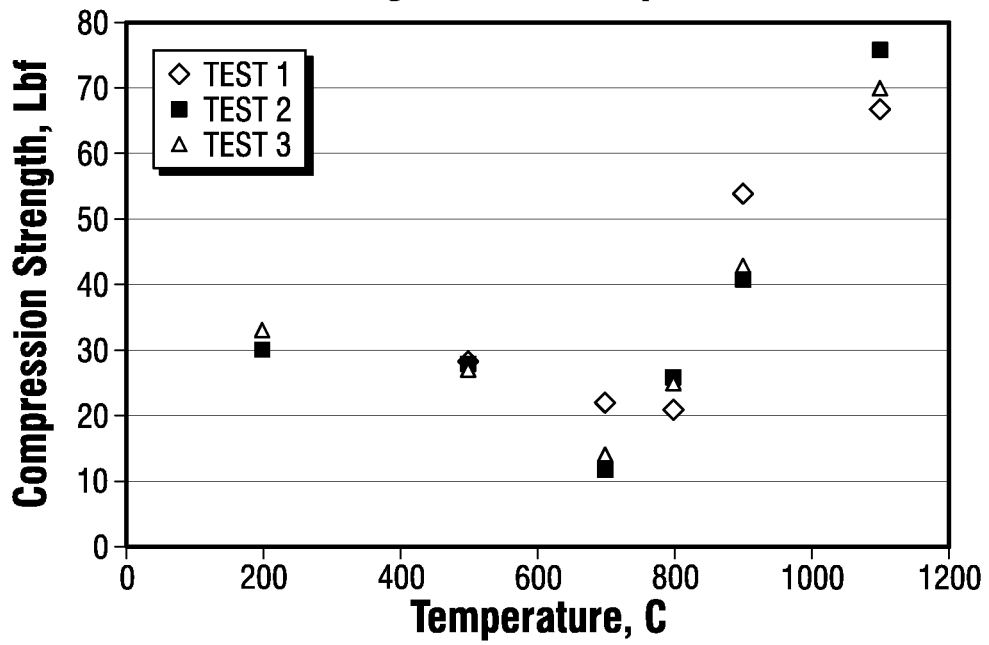
FIG. 19 shows a chart of compression strength versus temperature for 5% by weight sodium silicate addition.

FIG. 19 shows compression strength versus temperature for agglomerates containing 5% sodium silicate on a dry basis. The agglomerate constituents were: 53% silica, 33.5% phosphate, 8.5% pet coke and 5% sodium silicate. The agglomerates were formed in a laboratory-balling disk (36 cm diameter) and dried at 200 C for 15 minutes. Sodium silicate solution when dried forms an inorganic polymeric structure $Na_2(SiO_2)_nO$ commonly known as water glass. Three repeat tests were run showing good reproducibility. The initial compression strength was 30-35 $lb_f$ with less than 0.1% dust formation in a 15-minute attrition test. The compression strength is constant until the temperature reaches 700 C where the agglomerate loses compression strength to an average of the three tests less than 20 $lb_f$. Compression strength is regained at 800 C and increases dramatically when induration temperatures are reached with compression strength more than doubling the initial values at 1100 C.

Example 10

Figure 20:
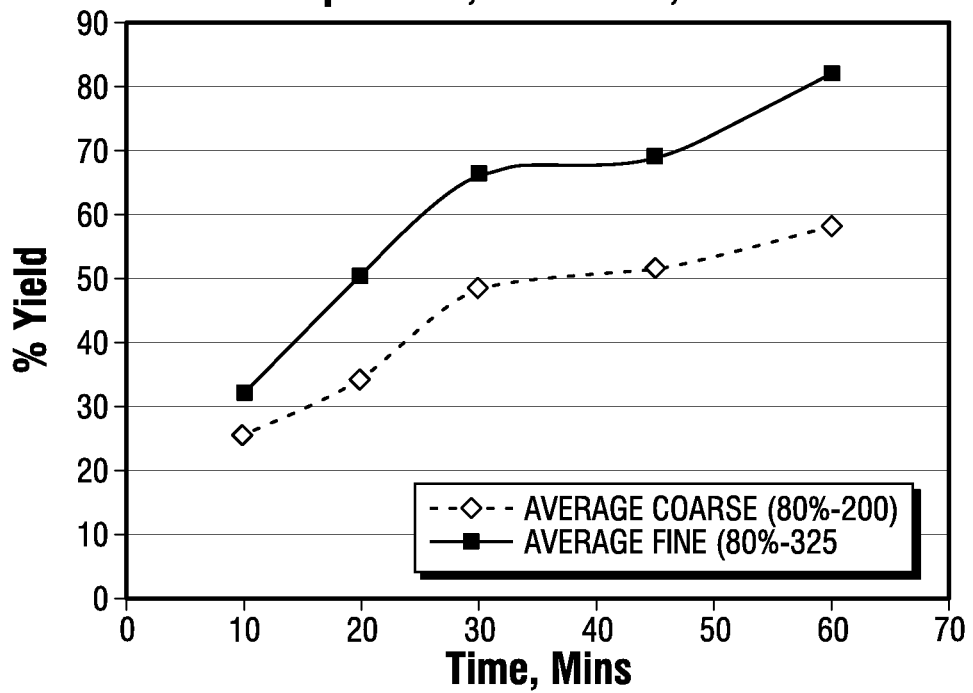
FIG. 20 shows a chart of $P_2O_5$ yield versus time at 1200 C for two different grind sizes.
Figure 21:
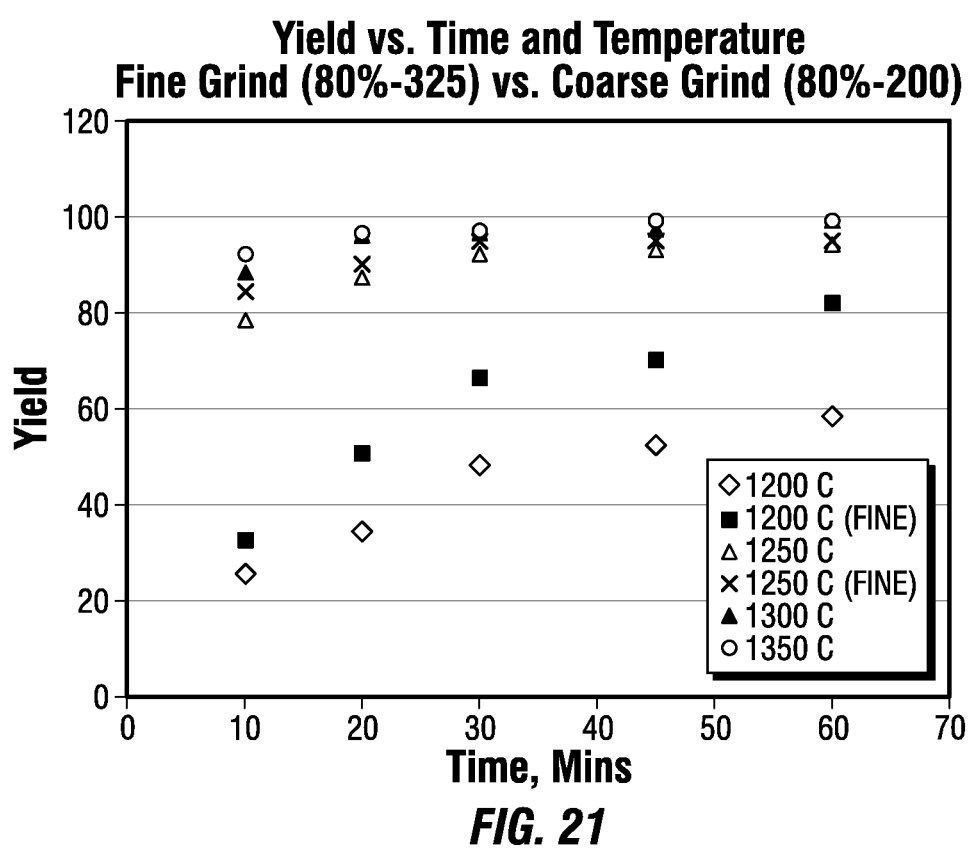
FIG. 21 shows a chart of $P_2O_5$ yield versus time at temperature with temperature and grind size of agglomerate constituents.

Agglomerates were prepared similarly to Examples 7-9. Agglomerate constituents were phosphate ore (35%), silica (55%) and pet coke (10%). Before agglomeration the constituents were ground using a ball mill to two different sizes 80% −200 mesh and 80% −325 mesh. After drying, the agglomerates were first indurated at 1100 C for 60 minutes and then heated at various reduction temperatures 1200 C, 1250 C, 1300 C and 1350 C for varying reduction times, measuring $P_2O_5$ yield. FIG. 20 shows $P_2O_5$ yield as a function of time at 1200 C. The fine grind size gives higher yields across all reduction times. FIG. 21 shows $P_2O_5$ yield as a function of time at reduction temperatures from 1200 C to 1350 C and grind size 80% −200 mesh and 80% −325 mesh. At temperatures of 1250 C and above, yields are 90% or higher after 30 minutes independent of grind size. Similarly, after 45 minutes yields are above 95%.

Example 11

Table 5 shows the change in chloride concentration in the feed agglomerates before and after induration at 1100 C for 30 and 60 minutes. The feed agglomerates were prepared in a balling disk and then dried at approximately 100 C. The agglomerates were then placed in a crucible and heated in a furnace with a nitrogen sweep for 30 minutes and 60 minutes. The concentration of chloride is reduced by more than 50%.

TABLE 5

Selected element concentration in feed agglomerates and concentration in the agglomerate after induration at 1100 C. for 30 and 60 minutes.

| Analyte | Units | Feed Agglomerates | 30 minute Induration | 60 minute Induration |
|---|---|---|---|---|
| Chloride | Mg/kg | 1150 | 378 | 507 |

Example 12

Feed agglomerates were formed using a lab pelletizer described below. The 12.7 mm diameter cylinders agglomerates were broken to approximately 2:1 to 1:1 L/D before induration. The agglomerates were formed from a mixture of phosphate ore (55%), pet coke (10%), sand (35%) and then Bentonite was added between 2-4% dry basis before water was added. Total dry solids were 5000 g and best results were achieved with added water of 850 ml. Two grind sizes were tested 80% −200 mesh and 80% −325 mesh.

Pelletizer description—J. C. Steele and Sons Laboratory extruder: 1) auger diameter 76 mm; 2) two extrusion barrels in-line with replaceable liners; 3) rear barrel is for feeding material to sealing die (to maintain vacuum); 4) front chamber/barrel is for extruding through a forming die subject to vacuum; 5) die holes were 12.7 mm; 6) auger die speed was 29.7 rpm.

Green Cylinder Strength—The compressed cylinders were far superior in dried green strength as compared to the spheres made in a balling disk of the same composition. The 12.7 mm cylinders averaged 70 $lb_f$ as compared to the same diameter spheres of 20 $lb_f$.

Induration Strength—The average induration strength for the agglomerate cylinders was 3-4 times higher than agglomerate spheres formed using a balling drum. Indurated agglomerate cylinders averaged 350-450 $lb_f$ compression strength versus agglomerate spheres of 100-$lb_f$ compression strength (same grind size). The 80% −325 grind size gave the highest compression strength. The cylinders also started indurating at lower temperatures. Tests indicated that induration started to occur at 900 C vs. 930 C for the spheres. The cylinder density increased approximately 1.8 times that of spheres.

Tumble Dust Potential—The "as is" feed agglomerate cylinders had a lower potential to dust as the dried feed spheres, but dusted more when indurated. This was due to the straight cylinder edges that had a tendency to wear down when tumbled or handled regardless of the strength. Tumble testing was accomplished in a rotating cylinder of 17.8 cm diameter, 20.3 mm in length, agglomerate charge of 500 g and 20 rpm for 15 minutes. Dust was collected from the tumble tester and measured as particles passing −40 mesh. Dried cylinder dusting: 1-3% versus dried sphere dusting: 3-5%. Indurated cylinder dusting: 2% versus indurated sphere dusting: ≈0.3-0.5%. Again, these were cylinders that still had their straight edges.

Tests where repeated with pre-rounded cylinder edges and then measured for dust potential. The dust levels dropped when the edges were pre-rounded. Dried cylinder dusting with pre-rounded edges: ≈0.5-1%. Indurated cylinder dusting with pre-rounded edges: 0.3%.

Regarding dusting, even though the initial strength of pellets is much higher than balls, it is expected that cylinders will dust as much as balls or more due to the edges wearing down, but will be as good or better when the edges are pre-rounded.

FEATURES AND BENEFITS

The features and benefits of the methods and systems described herein may be used in various combinations even though not specifically indicated. Examples of some possible combinations of features and benefits are described below.

1. A phosphorous pentoxide producing method comprising forming feed agglomerates prior to entering a rotary kiln (reduction kiln that produces P4O10/P2O5 gas, see FIGS. 2-10) that exhibits compression strength above 25 lbf, such as crush strength above 50 lbf, including compression strength above 100 lbf. The agglomerate may be produced via a balling drum or disc, and then heated in a reducing or inert atmosphere that hardens the agglomerate to the desired compression strength. The agglomerate may be heated to temperature above 900 C, but less than 1180 C, such as at temperatures of 1000-1125 C. The agglomerate may be held at these high temperatures for a minimum of 15 minutes, such as 30 to 90 minutes, including 60 to 90 minutes. The agglomerate may contain phosphate ore particles, carbonaceous material particles, clay particles, sufficient silica particles for the agglomerate to exhibit a calcium-to-silica mole ratio less than one, and silica-to-(calcium+magnesium) ratio greater than 2.

2. The method in paragraph 1 where the heating of the agglomerates is accomplished by a kiln (a separate induration kiln, see FIGS. 2, 3, 6, 7, 8). The kiln type can be a tunnel, rotary co-current or counter-current.

3. The method in paragraph 1 where the heating of the agglomerates is accomplished by a grate heater (grate only induration, see FIGS. 4 and 5). The agglomerates are then fed to the reducing kiln where $P_4O_{10}/P_2O_5$ gas is produced.

4. The method in paragraph 1 where the heating of the agglomerate is accomplished by a grate-heater-kiln system (see FIGS. 3, 6, 7, 8).

5. The method in paragraph 2 comprising maintaining a bed of agglomerates having a length, maintaining the bed at or above 950 C but less than 1180 C, such as less than 1100 C, along a substantial fraction of the bed length for a minimum of 15 minutes, such as a minimum of 30 minutes.

6. The method in paragraph 2 comprising maintaining a bed of agglomerates having a length, maintaining the bed at or above 950 C but less than 1180 C, such as less than 1100 C, along a substantial fraction of the bed length for a minimum of 15 minutes, such as a minimum of 30 minutes.

7. The method in paragraph 4 comprising maintaining a bed of agglomerates having a length, are pre-heated on the grate to temperatures at or near 950 C, then maintaining the bed in the kiln at or above 950 C but less than 1180 C, such as less than 1100 C, along a substantial fraction of the bed length for a minimum of 15 minutes, such as a minimum of 30 minutes.

8. The method in any of paragraphs 1 to 4 the agglomerate constituents (phosphate ore, silica, pet coke, and clay) are ground such that 80% or more of the particles are −200 mesh or less, including where 80% or more of the particles are −325 mesh or less.

9. The method in paragraph 7 where the product acid scrubber off-gas is made to be reducing and used to heat the bed of agglomerates on the grate-heater.

10. The method in paragraph 1 where a cooler is used between the induration process (straight grate, kiln, grate kiln) and the reducing kiln.

11. The method in paragraph 1 where most of the dust formed during the induration process is removed: on the grate, after the cooler and product scrubber.

12. The method in paragraph 1 where the agglomerates can be stored after the Indirect Cooler.

13. The method in paragraph 12 where the agglomerates can be stored between 100 C to 1000 C in an insulated tank under a reducing or inert atmosphere.

14. The method in paragraph 12 where the agglomerates can be stored at ambient conditions.

15. A phosphorous pentoxide producing method comprising forming feed agglomerate that exhibits compression strength above 25 $lb_f$, such as above 50 $lb_f$, including above 100 $lb_f$ that is produced via the use of a polymer additive that hardens the agglomerate to a compression strength above 25 $lb_f$ before it is heated to temperature above 900 C, but less than 1180 C, such as at temperatures of 1000-1100 C for a minimum of 15 minutes, such as a minimum of 30 minutes, including a minimum of 60 minutes, enabling the agglomerate to achieve the final desired compression strength. The agglomerate may be produced via a balling drum or disc using a polymer and then heated on a grate dryer at temperatures from 40 to 300 C, such as 40 to 150 C. This hardens the agglomerate to initial compression strength above 25 $lb_f$. The agglomerate contains: phosphate ore particles, carbonaceous material particles, sufficient silica particles for the agglomerate to exhibit a calcium-to-silica mole ratio less than one, a polymer, and clay particles.

16. The method in paragraph 15 where the heating of the agglomerates is accomplished by a kiln (a separate induration kiln, see FIGS. 2, 3, 6, 7, 8).

17. The method in paragraph 15 where the heating of the agglomerates is accomplished by a grate heater (grate only induration, see FIGS. 4 and 5). The agglomerates are then fed to the reducing kiln where $P_4O_{10}/P_2O_5$ gas is produced.

18. The method in paragraph 15 where the heating of the balls is accomplished by a grate-heater-kiln system (see FIGS. 3, 6, 7, 8).

19. The method in paragraph 16 comprising maintaining a bed of agglomerates having a length, maintaining the bed at or above 950 C but less than 1180 C, such as less than 1100 C, along a substantial fraction of the bed length for a minimum of 15 minutes, such as a minimum of 30 minutes.

20. The method in paragraph 17 or 18 comprising maintaining a bed of agglomerates having a length, maintaining the bed at or above 950 C but less than 1180 C, such as less than 1100 C, along a substantial fraction of the bed length for a minimum of 15 minutes, such as a minimum of 30 minutes.

21. The method in paragraph 15 comprising maintaining a bed of agglomerates having a length, are pre-heated on the grate to temperatures at or near 950 C, then maintaining the bed in the kiln at or above 950 C but less than 1180 C, such as less than 1100 C, along a substantial fraction of the bed length for a minimum of 15 minutes, such as a minimum of 30 minutes.

22. The method in paragraph 17 where the product acid scrubber off-gas, made reducing, is used to heat the bed of agglomerates on the grate-heater.

23. The method in any of paragraphs 15 to 18 where the polymer is one of the following types: acrylic, silicones, cross-linkable polyimides, epoxy, and silicates of sodium, potassium or lithium.

24. Standpipes are added to the ports on the reducing kiln and are of sufficient height to extend above the bed of agglomerates.

25. The standpipes in paragraph 24 are made of a castable ceramic in a cylinder or cone shape (large diameter attached to the kiln castable ceramic wall) which is cast around a high temperature alloy (e.g. Inconel® 601) hollow cylinder anchored to the kiln shell to enable air to pass into the kiln freeboard.

26. The method in paragraph 15 where most of the dust formed during the induration process is removed: on the grate, in the cooler (by use of a trommel screen) after the cooler and by the product scrubber.

27. The method in paragraph 1 or 15 where most of the dust formed during the induration process is removed by a cyclone and returned upstream to the rotary dryer.

28. The method in paragraph 27 where a fraction of the recycle dust to the rotary dryer is purged.

29. The method in any of paragraphs 1 to 4, 15 to 18, and 37 to 40 that agglomerate contaminants including: Al, As, Cd, Cl, Pb and Hg are significantly reduced in concentration from the feed agglomerates during induration process.

30. The method in paragraph 1 or 15 where trace impurities in the gas stream leaving the dust cyclone are removed in an adsorption column before returning to the process.

31. The method in paragraph 29 where the packed column packing can be made of one or more type of adsorbent, or multiple packed columns in series are used containing different adsorbents in each column.

32. The method in paragraph 30 where the packing in the column(s) is any of the following: carbon or metal oxides of Al, Fe, Cu, Zn, Ce and Ca.

33. The method in paragraph 1 or 15 that electricity or steam can be cogenerated in the process by recovering heat from the aggregate cooler.

34. The method in paragraph 1 or 15 where dust and trace impurities generated during induration are removed via a dust cyclone and scrubber.

35. The method in paragraph 1 or 15 depicted in FIGS. 3-10 where heat is generated in one or more of these sources: induration kiln, the moving grate heater, and the reduction kiln and can be recovered from either the aggregate cooler, and/or the grate cooler.

36. The method in any of paragraphs 15 to 19 where the agglomerate constituents (phosphate ore, silica, pet coke, and clay) are ground such that 80% of the particles are −200 mesh or less, including where 80% of the particles are −325 mesh or less.

37. A phosphorous pentoxide producing method comprising forming feed agglomerate that exhibits compression strength above 50 $lb_f$, such as above 70 $lb_f$, that is produced via the use of a pelletizer system that produces feed agglomerates at the compression strength before it is heated in a reducing or inert atmosphere to temperature above 900 C, but less than 1180 C, such as at temperatures of 950-1100 C for a minimum of 15 minutes, such as a minimum of 30 minutes, including a minimum of 60 minutes, enabling the agglomerate to achieve the final desired compression strength above 200 $lb_f$, including above 300 $lb_f$. The feed agglomerate is produced via a pelletizer system that makes rounded edge cylindrical agglomerates or by injection molding to make spherical agglomerates. These systems harden the feed agglomerate to initial compression strength above 70 $lb_f$. The agglomerate contains: phosphate ore particles, carbonaceous material particles, sufficient silica particles for the agglomerate to exhibit a calcium-to-silica mole ratio less than one, silica-to-(calcium+magnesium) ratio greater than 2, and clay particles from 2 to 5 wt. percent. The clay particles may contain Bentonite.

38. The method in paragraph 37 where the heating of the agglomerates is accomplished by a kiln (a separate induration kiln, see FIGS. 2, 3, 6, 7, 8). The kiln type can be a tunnel, rotary co-current or counter-current.

39. The method in paragraph 37 where the heating of the agglomerates is accomplished by a grate heater (grate only induration, see FIGS. 4 and 5). The agglomerates are then fed to the reducing kiln where $P_4O_{10}/P_2O_5$ gas is produced.

40. The method in paragraph 37 where the heating of the agglomerate is accomplished by a grate-heater-kiln system (see FIGS. 3, 6, 7, 8).

41. The method in paragraph 38 comprising maintaining a bed of agglomerates having a length, maintaining the bed at or above 950 C but less than 1180 C, such as less than 1100 C, along a substantial fraction of the bed length for a minimum of 15 minutes, such as a minimum of 30 minutes.

42. The method in paragraph 39 comprising maintaining a bed of agglomerates having a length, maintaining the bed at or above 950 C but less than 1180 C, such as less than 1100 C, along a substantial fraction of the bed length for a minimum of 15 minutes, such as a minimum of 30 minutes.

43. The method in paragraph 40 comprising maintaining a bed of agglomerates having a length, are pre-heated on the grate to temperatures at or near 950 C, then maintaining the bed in the kiln at or above 950 C but less than 1180 C, such as less than 1100 C, along a substantial fraction of the bed length for a minimum of 15 minutes, such as a minimum of 30 minutes.

44. The method in any of paragraphs 37 to 40 the agglomerate constituents (phosphate ore, silica, pet coke, and clay) are ground such that 80% of the particles are −200 mesh or less, but including when 80% of the particles are −325 mesh or less.

45. The method in paragraph 43 where the product acid scrubber off-gas is made to be reducing and then heated by cooling reduction kiln aggregate product; such recovered heat is used to heat the bed of agglomerates on the grate-heater.

46. The method in paragraph 37 where a cooler is used between the induration process (straight grate, kiln, grate kiln) and the reducing kiln.

47. The method in paragraph 37 where most of the dust formed during the induration process is removed: on the grate, after the cooler and product scrubber.

48. The method in paragraph 37 where the agglomerates can be stored after the Indirect Cooler 49. The method in paragraph 48 where the agglomerates can be stored between 100 C to 1000 C in an insulated tank under a reducing or inert atmosphere.

50. The method in paragraph 48 where the agglomerates can be stored at ambient conditions.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted.

What is claimed is:

1. A phosphorous pentoxide producing method comprising:
    forming pre-feed agglomerates containing phosphate ore particles, carbonaceous material particles, and silica particles;
    heating the pre-feed agglomerates in a reducing or inert atmosphere to an induration temperature from above 900 C to less than 1180 C and maintaining the induration temperature for 15 minutes or more;
    forming feed agglomerates and increasing a compression strength of the feed agglomerates to above 25 $lb_f$ using the heating, the feed agglomerates exhibiting a calcium-to-silica mole ratio less than 1 and a silica-to-(calcium+magnesium) mole ratio greater than 2;
    forming a reducing kiln bed using the feed agglomerates; and
    generating kiln off-gas and collecting phosphorous pentoxide from the kiln off gas.

2. The method of claim 1, wherein the crush strength is above 50 $lb_f$.

3. The method of claim 1, wherein the heating occurs in an induration kiln selected from the group consisting of a tunnel kiln, a rotary co-current kiln, and a rotary counter-current kiln.

4. The method of claim 1, wherein the heating occurs in a grate heater.

5. The method of claim 1, wherein the induration temperature is from 930 to 1125 C.

6. The method of claim 1, wherein the induration temperature is maintained for 30 to 90 minutes.

7. The method of claim 1, further comprising pre-heating the pre-feed agglomerates in a grate heater to a pre-heat temperature from 950 C to less than 1180 C before the heating at the induration temperature, which occurs in an induration kiln.

8. The method of claim 1, wherein the pre-feed agglomerates further contain clay particles and further comprising preparing the phosphate ore particles, carbonaceous material particles, clay particles, and silica particles such that 80% or more exhibit a size less than 200 mesh.

9. The method of claim 7, further comprising:
    scrubbing the kiln off-gas in a product acid scrubber and generating a scrubber off-gas;
    making the scrubber off-gas reducing; and
    using the reducing scrubber off-gas for the pre-heating in the grate heater.

10. The method of claim 1, further comprising adding over bed air through a plurality of ports along the bed length, the over bed air entering kiln freeboard through a plurality of standpipes extending from respective ports to a height above the bed.

11. The method of claim 1, wherein the pre-feed agglomerates comprise one or more contaminants selected from the group consisting of Al, As, Cd, Cl, Pb, and Hg and wherein the method further comprises decreasing a concentration of the contaminants in the feed agglomerates using the heating when compared to the pre-feed agglomerates.

12. A phosphorous pentoxide producing method comprising:
    forming green agglomerates containing phosphate ore particles, carbonaceous material particles, silica particles, and a polymer;
    drying the green agglomerates at a drying temperature from 40 to 300 C, the dried agglomerates exhibiting a compression strength above 25 $lb_f$;
    heating the dried agglomerates in a reducing or inert atmosphere to an induration temperature from above 900 to less than 1180 C and maintaining the induration temperature for 15 minutes or more;
    forming feed agglomerates and increasing a compression strength of the feed agglomerates to above 50 $lb_f$ using the heating, the feed agglomerates exhibiting a calcium-to-silica mole ratio less than 1 and a silica-to-(calcium+magnesium) mole ratio greater than 2;
    forming a reducing kiln bed using the feed agglomerates; and
    generating kiln off-gas and collecting phosphorous pentoxide from the kiln off gas.

13. The method of claim 12, wherein the crush strength is above 100 lb$_f$.

14. The method of claim 12, wherein the induration temperature is from 950 to 1100 C and is maintained for 30 minutes or more.

15. The method of claim 12, wherein the drying temperature is from 40 to 150 C and the green agglomerates further contain clay particles.

16. The method of claim 12, wherein the polymer comprises a compound selected from the group consisting of acrylics, silicones, cross-linkable polyimides, epoxies, silicates of sodium, potassium, or lithium, and a combination of organic and inorganic polymers.

17. The method of claim 12, wherein the polymer comprises $Na_2(SiO_2)_nO$.

18. The method of claim 12, wherein the dried agglomerates comprise one or more contaminants selected from the group consisting of Al, As, Cd, Cl, Pb, and Hg and wherein the method further comprises decreasing a concentration of the contaminants in the feed agglomerates using the heating when compared to the dried agglomerates.

19. The method of claim 12, further comprising preparing the phosphate ore particles, carbonaceous material particles, and silica particles such that 80% or more exhibit a size less than 200 mesh.

20. A phosphorous pentoxide producing method comprising:
    extruding a material to form green agglomerates containing phosphate ore particles, carbonaceous material particles, silica particles, and 2 to 5 wt % (dry basis) clay particles;
    drying the extruded, green agglomerates at a drying temperature from 40 to 150 C, the dried agglomerates exhibiting a compression strength above 50 lb$_f$;
    heating the dried agglomerates in a reducing or inert atmosphere to an induration temperature from above 900 to less than 1180 C and maintaining the induration temperature for 15 minutes or more;
    forming feed agglomerates and increasing a compression strength of the feed agglomerates to above 200 lb$_f$ using the heating, the feed agglomerates exhibiting a calcium-to-silica mole ratio less than 1 and a silica-to-(calcium+magnesium) mole ratio greater than 2;
    forming a reducing kiln bed using the feed agglomerates; and
    generating kiln off-gas and collecting phosphorous pentoxide from the kiln off gas.

21. The method of claim 20, wherein the induration temperature is from 1000 to 1100 C and is maintained for 30 to 90 minutes.

22. The method of claim 20, further comprising preparing the phosphate ore particles, carbonaceous material particles, clay particles, and silica particles such that 80% or more exhibit a size less than 325 mesh.

23. The method of claim 20, wherein the dried agglomerates comprise one or more contaminants selected from the group consisting of Al, As, Cd, Cl, Pb, and Hg, wherein the induration temperature is maintained for 60 minutes or more, and wherein the method further comprises decreasing a concentration of the contaminants in the feed agglomerates using the heating when compared to the dried agglomerates.

* * * * *